(12) United States Patent
Konet et al.

(10) Patent No.: US 9,586,491 B2
(45) Date of Patent: Mar. 7, 2017

(54) VEHICLE WIRELESS CHARGING STRUCTURE

(71) Applicant: Nissan North America, Inc., Franklin, TN (US)

(72) Inventors: Heather Konet, Canton, MI (US); Eloi Taha, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 137 days.

(21) Appl. No.: 14/732,343

(22) Filed: Jun. 5, 2015

(65) Prior Publication Data

US 2016/0355093 A1    Dec. 8, 2016

(51) Int. Cl.
*H02J 7/00* (2006.01)
*B60L 11/18* (2006.01)
*H02J 7/02* (2016.01)

(52) U.S. Cl.
CPC ......... *B60L 11/182* (2013.01); *B60L 11/1831* (2013.01); *H02J 7/0042* (2013.01); *H02J 7/025* (2013.01)

(58) Field of Classification Search
CPC ..... B60L 11/182; B60L 11/1831; H02J 7/025; H02J 7/0042
USPC .................................................. 320/108, 109
See application file for complete search history.

(56) References Cited

U.S. PATENT DOCUMENTS

| 5,498,948 A | 3/1996 | Bruni et al. |
| 5,617,003 A | 4/1997 | Odachi et al. |
| 7,880,337 B2 * | 2/2011 | Farkas ................. B60L 11/005 307/104 |
| 8,264,197 B2 | 9/2012 | Shimoyama |
| 8,483,899 B2 | 7/2013 | Martin |
| 8,700,258 B2 | 4/2014 | Tate, Jr. et al. |
| 8,816,637 B2 | 8/2014 | Martin et al. |
| 2007/0131505 A1 | 6/2007 | Kim |
| 2010/0235006 A1 | 9/2010 | Brown |
| 2011/0254503 A1 | 10/2011 | Widmer et al. |
| 2013/0304298 A1 | 11/2013 | Baier et al. |
| 2014/0035526 A1 * | 2/2014 | Tripathi ............. B60L 11/1838 320/109 |
| 2014/0132208 A1 | 5/2014 | Fisher |
| 2014/0217966 A1 | 8/2014 | Schneider et al. |
| 2014/0225433 A1 * | 8/2014 | Niizuma .................. B60L 7/14 307/10.1 |

* cited by examiner

*Primary Examiner* — Nathaniel Pelton

(74) *Attorney, Agent, or Firm* — Global IP Counselors, LLP

(57) ABSTRACT

An alignment assembly includes a first track, a first shield, a first positioning device, a second track, a second shield, a second positioning device and an induction coil. The first track defines a first axis. The first shield is movable along the first track and the first axis. The first positioning device is configured to move the first shield along the first track. The second track is fixedly attached to a second side of the first shield opposite the first side of the first shield. The second track defines a second axis transverse to the first axis. The second shield has a first side mounted to the second track for movement along the second track. The second positioning device is coupled to the first shield, and is configured to move the second shield along the second track. The vehicle-side induction coil is fixedly attached to the second shield.

19 Claims, 11 Drawing Sheets

VEHICLE WIRELESS CHARGING STRUCTURE

BACKGROUND

Field of the Invention

The present invention generally relates to a vehicle wireless charging structure. More specifically, the present invention relates to a vehicle with a coil alignment structure that automatically aligns a vehicle-side induction coil with a transmission coil prior to charging a battery of the vehicle.

Background Information

A vehicle wireless charging system includes a charging station that is typically installed with a garage or carport and includes a transmission coil configured to emit electromagnetic radiation received by a receiving coil on a vehicle for purposes of recharging a battery of the vehicle. Such wireless systems typically include a positioning mechanism as a part of the charging station for aligning the transmission coil with the receiving coil on the vehicle after the vehicle has been parked within the garage or carport. A problem with such an arrangement is that when the receiving coil is located along an underside of the vehicle, the transmission coil and its positioning structure must be installed below an exposed surface of a floor of the garage or carport. The installation of the transmission coil and positioning structure below the level of the floor of the charging station can be costly and difficult.

SUMMARY

One aspect of the current disclosure is to provide a receiving coil installed to an underside of the vehicle that includes an alignment assembly that automatically aligns the receiving coil with a floor mounted transmission coil once the vehicle has been parked above the transmission coil.

In view of the state of the known technology, one aspect of the present disclosure is to provide a vehicle with a wireless charging structure that includes a vehicle body structure, a first track structure, a first shield plate, a first positioning device, a second track structure, a second shield plate, a second positioning device and a vehicle-side induction coil. The first track structure is fixedly attached to the vehicle body structure, and extends along a first axis. The first shield plate is movably coupled to the first track structure for movement along the first axis. The first positioning device is coupled to vehicle body structure and is configured to move the first shield plate along the first axis along the first track structure. The second track structure is fixedly attached to a second side of the first shield plate opposite the first side of the first shield plate. The second track structure defines a second axis transverse to the first axis. The second shield plate has a first side movably mounted to the second track structure for movement along the second axis. The second positioning device is coupled to the first shield plate, and is configured to move the second shield plate along the second axis and the second track structure. The vehicle-side induction coil is fixedly attached to a second side of the second shield plate opposite the first side of the second shield plate. The vehicle-side induction coil is configured to generate electric current in response to reception of electromagnetic radiation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
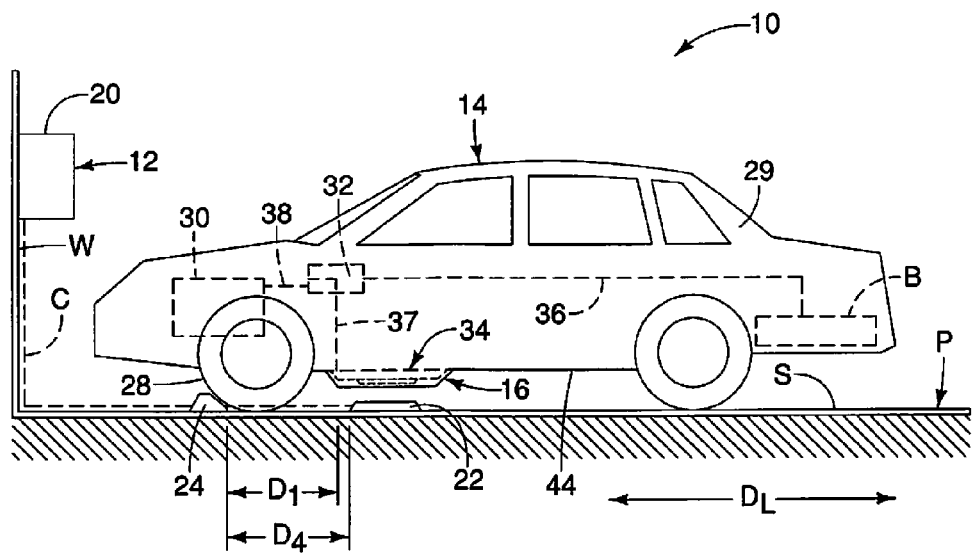
FIG. 1 is a side schematic view of a vehicle wireless charging structure including a transmission charging assembly and a vehicle, the transmission charging assembly having a power controller and a transmission coil installed to respective surfaces of a parking area, the vehicle having an alignment assembly with a controller and a vehicle-side induction coil (a reception coil) in accordance with a first embodiment.

Referring initially to FIG. 1, a wireless charging structure 10 that includes a transmission charging assembly 12 and a vehicle 14 having a reception charging assembly 16 is illustrated in accordance with a first embodiment.

The wireless charging structure 10 is designed such that when the vehicle 14 is parked above a portion of the transmission charging assembly 12, a battery B within the vehicle 14 can be charged. The vehicle 14 includes structure that automatically aligns the reception charging assembly 16 with the transmission charging assembly 12 such that transmission of energy from the transmission charging assembly 12 to the reception charging assembly 16 is optimized, thereby improving the process of re-charging the battery B, as is described in greater detail below.

Figure 2:
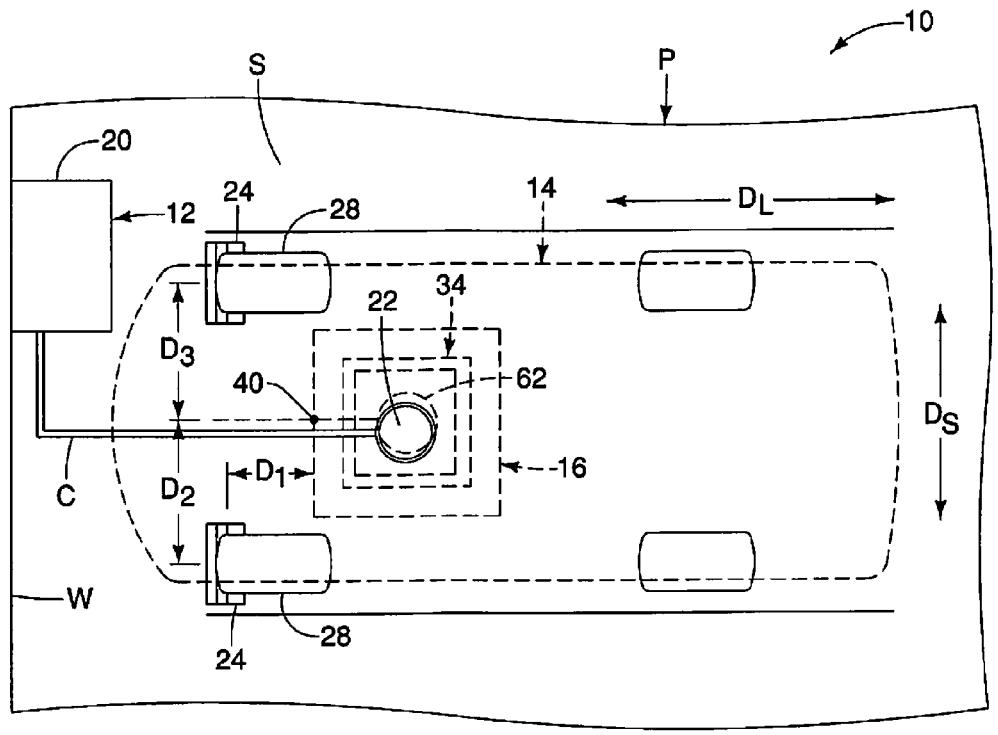
FIG. 2 is a top schematic view of the vehicle wireless charging structure showing the power controller and the transmission coil of the transmission charging assembly installed within the parking area, and showing the vehicle-side induction coil and the controller of the alignment assembly of the vehicle in phantom overlaying the transmission coil in accordance with the first embodiment.

As shown in FIGS. 1 and 2, the transmission charging assembly 12 includes elements that are installed in a parking area P dimensioned to receive the vehicle 14. The parking area P can be a driveway, a private garage space, a commercial garage space or carport and includes a horizontally oriented surface S and a vertical wall W. It should be understood from the drawings and the description herein that the surface S can be a level surface, but a level orientation is not required. The transmission charging assembly 12 can alternatively be installed to a parking area with a surface S that has a slight incline. In the depicted embodiment, the surface S is depicted as being level. The parking area P includes a space sufficiently large to receive the vehicle 14.

As is further shown in FIGS. 1 and 2, the transmission charging assembly 12 includes a power controller 20, a transmission coil 22, a pair of wheel chocks or stops 24 and a cable C connecting the power controller 20 to the transmission coil 22. In the depicted embodiment, the power controller 20 is mounted to the vertical wall W. Alternatively the power controller 20 can be located remote relative to the parking area P, or can be a free-standing unit connected to household circuitry. For example, the power controller 20 can be installed in a closet, basement area or other enclosed area (not shown) remote from the parking area P. Further, the power controller 20 can be installed as a free-standing recharging station located in a commercial parking area with a dedicated parking space adjacent thereto.

The power controller 20 of the transmission charging assembly 12 includes a power supply (not shown) connected to, for example, a commercial electricity power source that is preferably 220 volts AC, but can provide current at voltage levels greater or less than 220 volts, depending upon available electric power. The power controller 20 also includes circuitry and pre-programmed control logic that enables the power controller 20 to wirelessly communicate with the reception charging assembly 16 of the vehicle 14 in a manner described in greater detail below.

The transmission coil 22 is fixedly and non-movably attached to the surface S within the parking area P at a predetermined location. The stops 24 are also fixedly attached to surface S of the parking area P, but can be configured for removal and repositioning. The stops 24 are installed to the surface S of the parking area P in predetermined locations relative to the transmission coil 22 and relative to the location of the reception charging assembly 16 of the vehicle 14. Specifically, the stops 24 are positioned relative to the transmission coil 22 such that when the vehicle 14 is driven into the parking area P, front wheels 28 of the vehicle contact the stops 24 thereby restricting further movement of the vehicle 14, thereby assisting the vehicle operator during parking maneuvers of the vehicle 14 such that the vehicle 14 is parked in or close to a predetermined location. This predetermined location is such that portions of the reception charging assembly 16 of the vehicle 14 are located above the transmission coil 22 in an approximate alignment position once parked. An example of the approximate alignment position is depicted in, for example, FIG. 12a and is described in greater detail below. As shown in FIG. 2, the parking area P can also include lines that assist the vehicle operator in positioning of the vehicle 14 in the parking area.

As shown in FIG. 1, the vehicle 14 includes a vehicle body structure 29, a power plant 30, the battery B and the reception charging assembly 16. The reception charging assembly 16 includes a controller 32, an alignment assembly 34 and cables 36, 37 and 38. The cable 36 connects the reception charging assembly 16 with the controller 32. The cable 37 connects the controller 32 with the power plant 30 and the cable 38 connects the battery B with the controller 32 and the power plant 30.

The power plant 30 is supported in a conventional manner within the vehicle body structure 20 and includes an electric motor that provides rotary power to the vehicle 14 in a conventional manner. Since electric motors for vehicles are conventional vehicle devices, further description is omitted for the sake of brevity. Alternatively, the power plant 30 can be a hybrid motor that includes an internal combustion engine that operates in concert with an electric motor in a conventional manner. The power plant 30 receives electric power from the battery B in a conventional manner.

The battery B is a rechargeable battery that is recharged by the reception charging assembly 16 in a manner described in greater detail below. Although not shown, the battery B can also be recharged via an electric connector (not shown) provided on the vehicle 14 such that the battery B is recharged via a direct electrical connection via the controller 32 and the electric connector. However, in the depicted embodiment, the battery B is primarily recharged via the wireless charging structure 10, where electromagnetic energy is transmitted by the transmission coil 22 and is received by the reception charging assembly 16 of the vehicle 14 in a manner described in greater detail below.

The controller 32 includes voltage convertor circuit that converts alternating current transmitted by the transmission coil 22 into direct current used to charge the battery B. The controller 32 also includes circuitry (such as a microcomputer) that is programmed to operate the reception charging assembly 16 during an alignment process that is described in greater detail below. The circuitry of the controller 32 is also configured to communicate with the power controller 20 of the transmission charging assembly 12 via any of a plurality of communication methods and structures. For example, the power controller 20 and the controller 32 can each include wireless communication devices such as Bluetooth® devices, Wi-Fi devices, or can be configured to wirelessly communicate with one another via transmissions between the transmission coil 22 and the reception charging assembly 16. Since such wireless communication capabilities are conventional technologies, further description is omitted for the sake of brevity.

As shown in FIGS. 1 and 2, the alignment assembly 34 is mounted directly to the vehicle 14. In the depicted embodiment, the alignment assembly 34 is mounted to the underside of the vehicle 14, but can alternatively be mounted within the body structure of the vehicle 14, so long as the alignment assembly 34 is mounted to a location of the vehicle 14 that does not interfere with reception of electromagnetically transmitted energy from the transmission coil 22.

In the depicted embodiment, the alignment assembly 34 is fixedly attached to the underside of the vehicle 14. The alignment assembly 34 is centrally located beneath, for example, the front seats (not shown) of the vehicle 14. It should be understood from the drawings and the description herein that the actual installed location of the alignment assembly 34 can vary from vehicle to vehicle and is not limited to the depicted location. For example, the alignment assembly 34 can alternatively be installed to a front end, a rear end, a side panel or the roof panel of the vehicle 14 with the transmission coil 22 being installed to an appropriate corresponding location within the parking area P.

One aspect of the actual location of the alignment assembly 34 with respect to the vehicle 14, is the location of the front wheels 28 relative to a reference point 40 on the alignment assembly 34. For purposes of understanding the wireless charging structure 10, the reference point 40 is a point along the front edge of the alignment assembly 34 that is centrally located with respect to the alignment assembly 34. However, it should be understood from the drawings and the description herein, that the reference point 40 is an arbitrary point chosen for the expressed purpose of proper installation of elements of the wireless charging structure 10 with respect to one another, and is not an absolute fixed location.

A first distance $D_1$ is defined in a vehicle longitudinal direction $D_L$ between a lower tread portion of the front wheels 28 and the reference point 40. Second and third distances $D_2$ and $D_3$ are defined in vehicle lateral directions $D_S$ (laterally side to side relative to the vehicle 14) between a center of respective ones of the front wheels 28 of the vehicle 14 and the reference point 40.

Further, the transmission coil 22 is provided with a similar reference point at a front edge thereof. In FIG. 2 the reference point 40 of the alignment assembly 34 and a reference point of the transmission coil 22 coincide. Therefore, only the reference point 40 is visible in FIG. 2. When the transmission coil 22 and the stops 24 are installed to the surface S of the parking area P, the first, second and third distances $D_1$, $D_2$ and $D_3$ are used to position the transmission coil 22 and the stops 24 relative to one another.

Specifically, the relative positioning of the transmission coil 22 and the stops 24 is directly determined by the distances between the alignment assembly 34 and the front wheels 28 and relative to parking lines on the surface S of the parking area P. The stops 24 are installed to the surface S with a distance in the vehicle lateral direction Ls between respective centers thereof that is equal to the second distance $D_2$ plus the third distance $D_3$, as shown in FIG. 2. Thereafter, the transmission coil 22 is positioned and fixedly installed with its front center (the reference point) being located in the vehicle lateral directions $D_S$ the second distance $D_2$ from a first one of the front wheels 28 and is located the third distance $D_3$ from a second one of the front wheels 28. Further, the transmission coil 22 is positioned relative to the vehicle longitudinal direction $D_L$ with its front center (the reference point) being located the first distance $D_1$ from the surface of the stops 24.

Consequently, when the vehicle 14 is parked on the surface S above the transmission coil 22, with the front wheels 28 contacting the stops 24, the alignment assembly 34 will be located above the transmission coil 22. However, the location of the alignment assembly 34 may not be perfectly centered above the transmission coil 22 with the vehicle 14 parked due to the size of the vehicle 14 and the fact that the vehicle operator cannot see the alignment assembly 34 and the transmission coil 22 while parking the vehicle 14. The final parked location of the vehicle 14 will likely vary slightly each time the vehicle 14 is driven and then returned and parked on the surface S. Therefore, once the vehicle 14 is parked, the alignment assembly 34 will overlap the transmission coil 22, but will not necessarily be perfectly aligned therewith, for example, as depicted in FIG. 2. If the alignment assembly 34 is not properly centered (or close to being centered within a predetermined tolerance) above the transmission coil 22, then recharging efficiency may not be optimal. This situation is referred to as the above mentioned approximate alignment position, where the alignment assembly 34 is located above the transmission coil 22, but is not precisely aligned within predetermined tolerances. Therefore, the alignment assembly 34 is configured to more closely align itself with the transmission coil 22, as described in greater detail below.

A description of the alignment assembly 34 is now provided with specific reference to FIGS. 3-7. The alignment assembly 34 is depicted schematically in FIGS. 3 and 4, attached to an underside surface 44 of the vehicle 14.

The alignment assembly 34 basically includes an outer cover 48, a first track structure 50, a first shield plate 52, a first positioning device 54, a second track structure 56, a second shield plate 58, a second positioning device 60 and a vehicle-side induction coil 62.

The outer cover 48 is a protective cover that primarily serves to protect the various components of the alignment assembly 34. The outer cover 48 is composed of, for example, a non-conductive material that does not interfere with the transmission and reception of electromagnetic radiation (power transmissions) from the transmission coil 22 to the vehicle-side induction coil 62. The outer cover 48 is dimensioned and shaped to cover the first track structure 50, the first shield plate 52, the first positioning device 54, the second track structure 56, the second shield plate 58, the second positioning device 60 and the vehicle-side induction coil 62. Further the outer cover 48 is dimensioned such that it does not interfere with movement of any of the elements of the alignment assembly 34 throughout the entire range of movement of the first shield plate 52 and the second shield plate 58 during the alignment process described below. The outer cover 48 is directly attached to the underside surface 44 of the vehicle 14 via fasteners (not shown) in a conventional manner.

Figure 3:
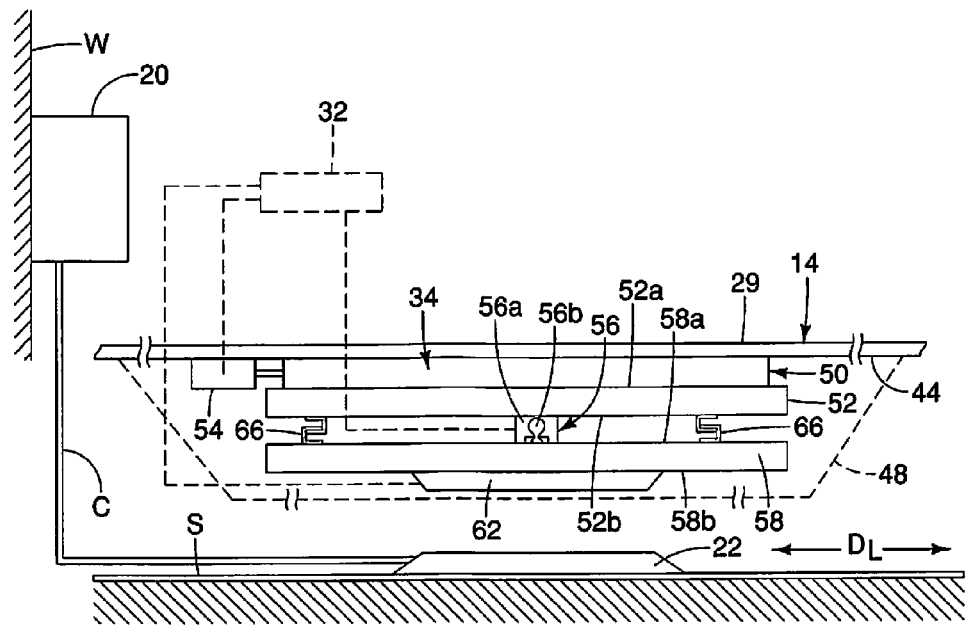
FIG. 3 is a side schematic view of a portion of the vehicle wireless charging structure showing the alignment assembly with the vehicle-side induction coil located above the transmission coil in accordance with the first embodiment.
Figure 5:
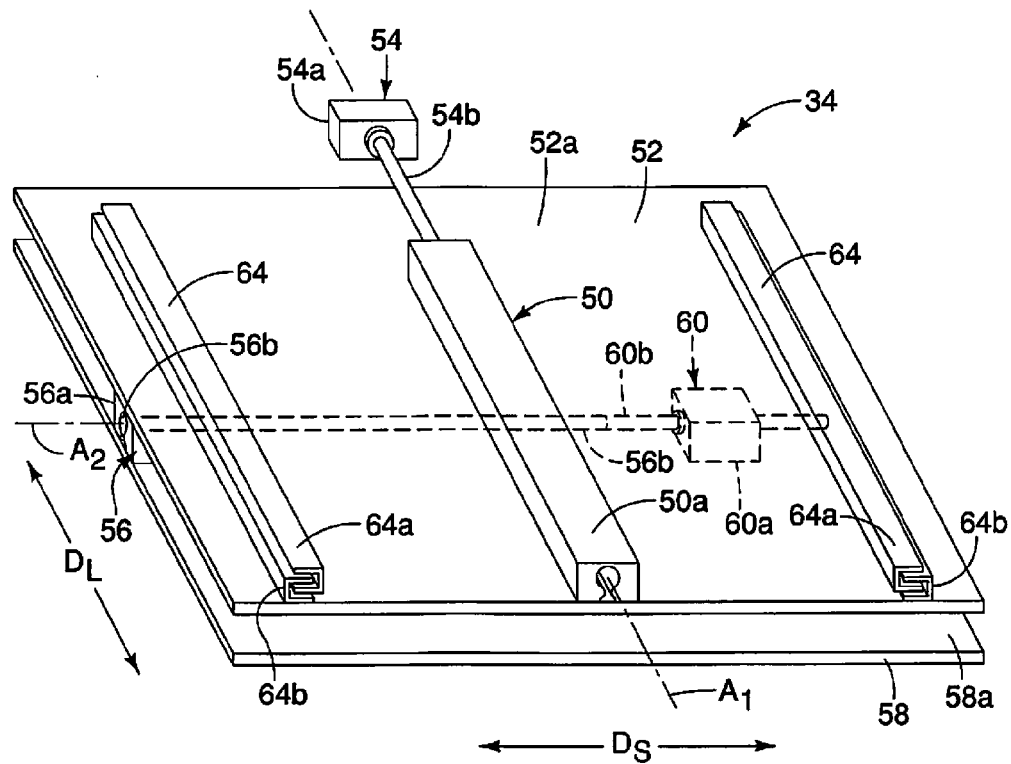
FIG. 5 is a perspective view of the alignment assembly shown removed from the vehicle showing a first track structure and linear support structures that support a first shield plate to an underside surface of the vehicle in accordance with the first embodiment.
Figure 7:
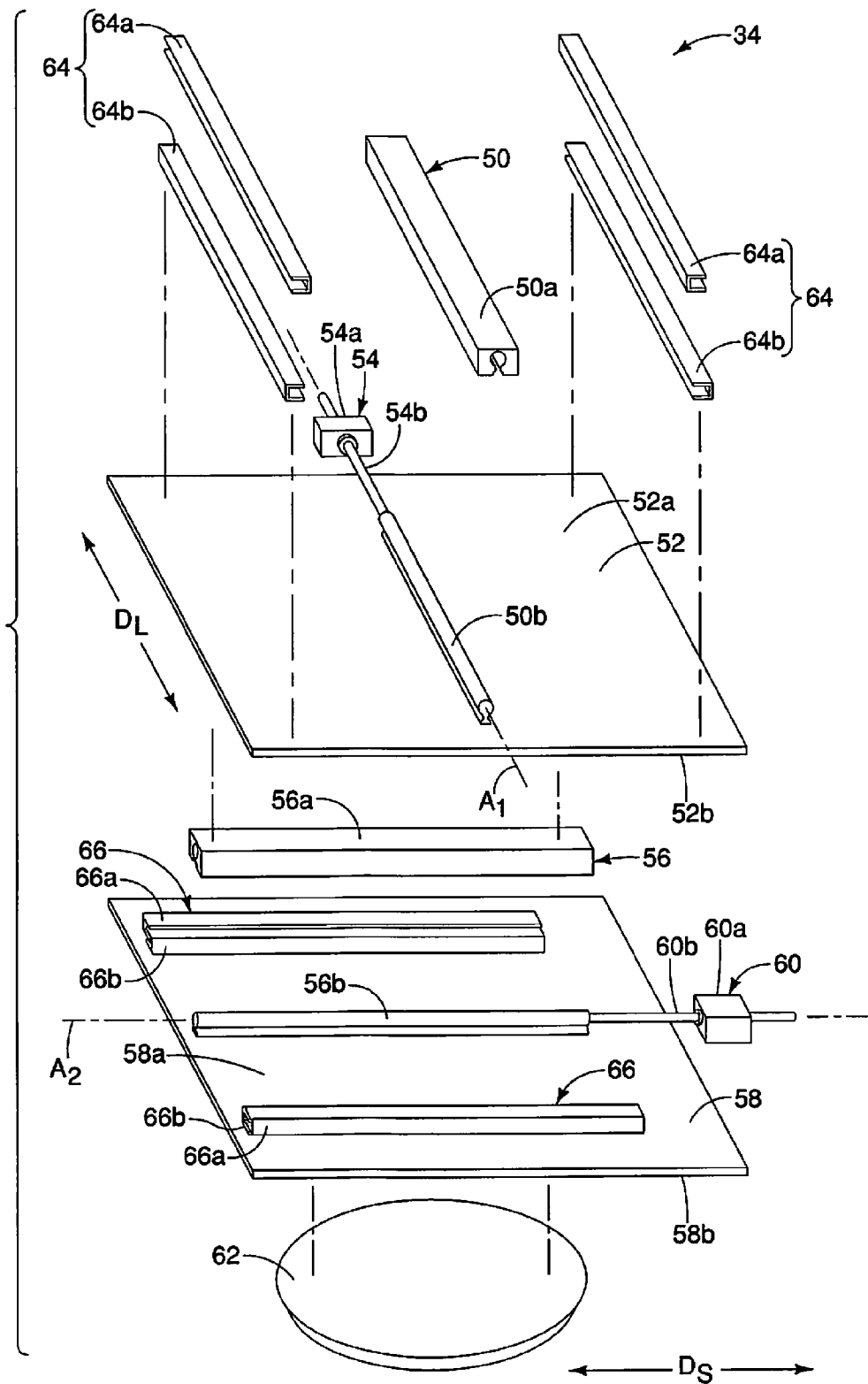
FIG. 7 is an exploded perspective view of the alignment assembly showing the first track structure, a pair of linear support structures, a first positioning device, the first shield plate, a second track structure, another pair of linear support structures, a second positioning device, a second shield plate and the vehicle-side induction coil in accordance with the first embodiment.

As shown in FIGS. 3, 5 and 7, the first track structure 50 includes a fixed track member 50a and a slider 50b that is installed within the fixed track member 50a such that the slider 50b can freely slide linearly along the fixed track member 50a. One of the fixed track member 50a and the slider 50b is coated with a frictionless material, such as, for example, polytetrafluoroethylene (PTFE) or other similar friction reducing material. In the depicted embodiment, the slider 50b is retained within the fixed track member 50a by narrowed lower ends that prevent lateral movement of the slider 50b in directions perpendicular to the length of the fixed track member 50a. Specifically, since the fixed track member 50a extends in the vehicle longitudinal direction $D_L$, the first shield plate 52 is prevented from moving in the vehicle lateral directions $D_S$. However, the slider 50b can freely slide along the length of the fixed track member 50a. The fixed track member 50a is rigidly attached to the underside surface 44 of the vehicle body structure 29 via, for example, mechanical fasteners (not shown). The slider 50b is rigidly attached to an upper surface 52a (a first side) of the first shield plate 52 via, for example, mechanical fasteners (not shown).

Figure 6:
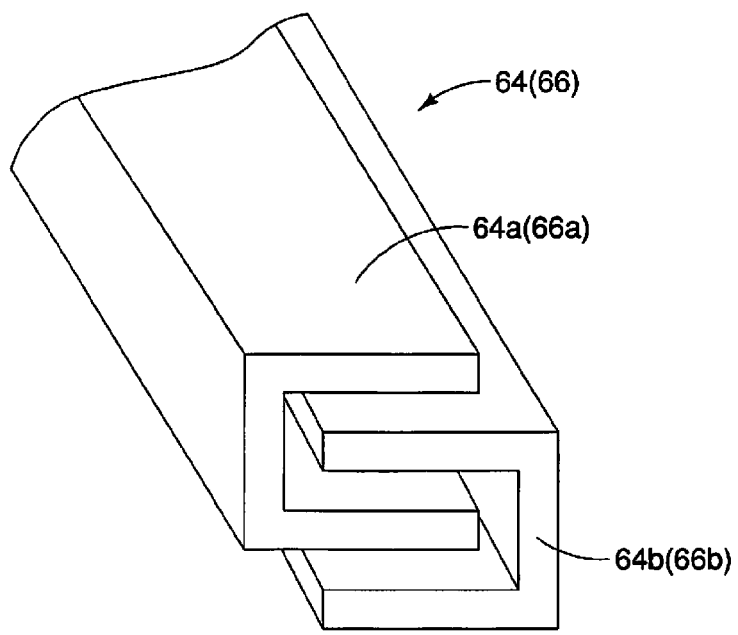
FIG. 6 is a perspective view of one of the linear support structures of the alignment assembly shown removed from the alignment assembly in accordance with the first embodiment.

The first track structure 50 can further include at least one and preferably two linear support structures 64 as shown in FIGS. 5-7. The linear support structures 64 define additional track structures that are parallel to the fixed track member 50a and the slider 50b when all are installed within the alignment assembly 34. Each of the linear support structures 64 includes an upper slider 64a and a lower slider 64b, as shown in FIG. 6. The lower slider 64b can freely slide along the upper slider 64a. Surfaces of one or both of the lower slider 64b and the upper slider 64a that slidably contact one another can be provided with a frictionless material, such as, for example, polytetrafluoroethylene (PTFE) or other similar friction reducing material. The upper sliders 64a are fixedly attached to the underside surface 44 of the vehicle body structure 29 via, for example, mechanical fasteners (not shown). The lower sliders 64b are rigidly fixed to the upper surface 52a of the first shield plate 52 via, for example, mechanical fasteners (not shown).

The first track structure 50 (the fixed track member 50a and the slider 50b) defines a first axis $A_1$ (FIGS. 5 and 7) that corresponds to and/or is parallel to the vehicle longitudinal direction $D_L$. More specifically, the slider 50b is movable along the first axis $A_1$. The slider 50b is configured to slide along the first axis $A_1$ along the length of the fixed track member 50a. The linear support structures 64 of the first track structure 50 extend parallel to the first axis $A_1$. Hence, the lower sliders 64b are configured to slide in directions parallel to the first axis $A_1$ along the upper sliders 64a. The linear support structures 64 provide support and add stability to movement of the first shield plate 52 along the fixed track member 50a. The linear support structures 64 also prevent rotation about the first axis $A_1$.

The fixed track member 50a and slider 50b are elements that provide precision positioning of the first shield plate 52 when the first shield plate 52 is moved and positioned by the actions of the first positioning device 54 (described in greater detail below). Whereas, the linear support structures 64 are provided for support of the first shield plate 52 and other elements supported by the first shield plate 52.

The fixed track member 50a, the slider 50b and the linear support structures 64 support the first shield plate 52 such that the first shield plate 52 can be moved along the first axis A (in the vehicle longitudinal direction $D_L$) and positioned with precision by the first positioning device 54, as is described in greater detail below.

As mentioned above, the first shield plate 52 is fixed to the slider 50b and the lower sliders 64b. Consequently, the first shield plate 52 is movably connected to the underside surface 44 of the vehicle 14 for linear movement with respect thereto via the support of the sliding movement of the slider 50b along the fixed track member 50a and the sliding movement of the lower sliders 64b along the upper slider 64a. More specifically, the first shield plate 52 is supported by the first track structure 50 only for movement along the first axis $A_1$ (the vehicle longitudinal direction $D_L$).

Figure 4:
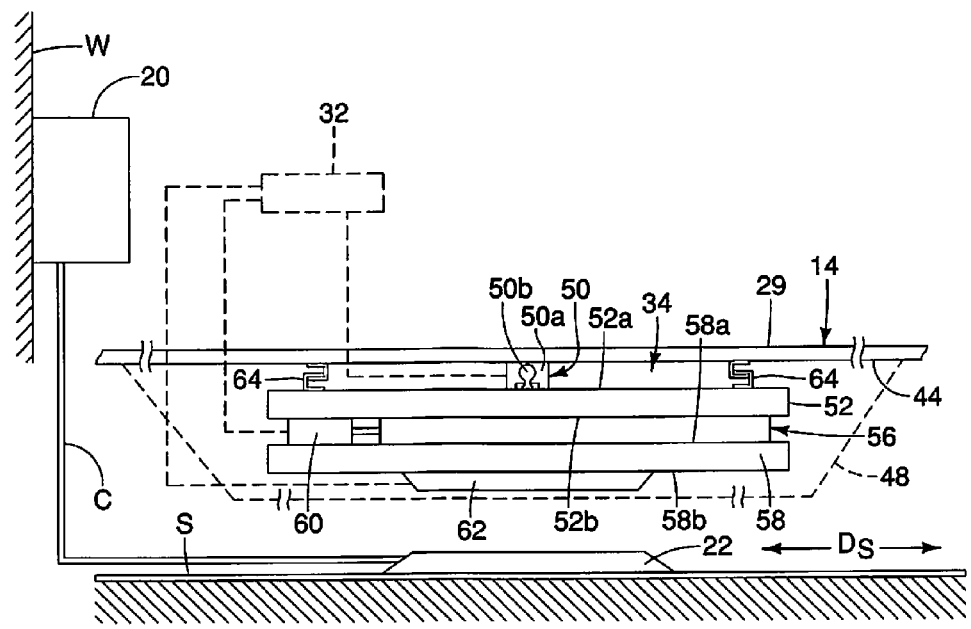
FIG. 4 is a front schematic view of the portion of the vehicle wireless charging structure shown in FIG. 3, showing the alignment assembly with the vehicle-side induction coil located above the transmission coil in accordance with the first embodiment.

The first shield plate 52 is made of a material or can include layer of a material that prevents transmission of electromagnetic radiation from a lower surface 52b (a second side) to the upper surface 52a (the first side) of the first shield plate 52. The first shield plate 52 is longer in the vehicle longitudinal direction $D_L$ and wider in the vehicle lateral directions $D_S$ than the vehicle-side induction coil 62 and the transmission coil 22, as is shown in FIGS. 3 and 4. Hence, the first shield plate 52 extends outward beyond an outer periphery of the vehicle-side induction coil 62 throughout an entire range of movement of the first shield plate 52. Consequently, the first shield plate 52 provides a shielding effect that prevents electromagnetic radiation from penetrating the vehicle body structure 29 and passing into the passenger compartment of the vehicle 14.

The first positioning device 54 includes a housing 54a and a shaft 54b. In the depicted embodiment, the first positioning device 54 is basically a stepper motor or other positioning device that can precisely move and position an object connected thereto to a plurality of positions within a predetermined tolerance. In the alignment assembly 34, the first positioning device 54 can achieve precise linear positioning movement of the first shield plate 52 to within, for example, ±1.0 mm. The shaft 54b of the first positioning device 54 is moved linearly via worm gears (not shown) and/or other linear movement structures to effect movement and positioning of the first shield plate 52. Since stepper motors are conventional electro-mechanical devices, further description is omitted for the sake of brevity.

The housing 54a of the first positioning device 54 is fixedly attached to the underside surface 44 of the vehicle 14. The shaft 54b is fixedly connected to the slider 50b. Since the slider 50b (which defines the first axis $A_1$) is attached to the first shield plate 52, movement of the slider 50b by the first positioning device 54 causes corresponding linear movement of the first shield plate 52 along the first axis $A_1$ (in the vehicle longitudinal direction $D_L$).

A description of the second track structure 56 and the second shield plate 58 is now provided with specific reference to FIGS. 4-7. The second track structure 56 includes a fixed track member 56a and a slider 56b that is installed within the fixed track member 56a such that the slider 56b can freely slide along the fixed track member 56a. One of the fixed track member 56a and the slider 56b is coated with a frictionless material, such as, for example, polytetrafluoroethylene (PTFE) or other similar friction reducing material. In the depicted embodiment, the slider 56b is retained within the fixed track member 56a by narrowed lower ends that prevent lateral movement (no movement in directions perpendicular to the length of the fixed track member 56a). The fixed track member 56a is rigidly attached to the lower surface 52b of the first shield plate 52 via, for example, mechanical fasteners (not shown). The slider 56b is rigidly attached to an upper surface 58a (a first side) of the second shield plate 58 via, for example, mechanical fasteners (not shown).

The second track structure 56 can further include at least one and preferably two linear support structures 66. The linear support structures 66 define further track structures that are parallel to the fixed track member 56a and the slider 56b when all are installed within the alignment assembly 34. Each of the linear support structures 66 includes an upper slider 66a and a lower slider 66b, as shown in FIG. 6. The lower slider 66b can freely slide along the upper slider 66a. Surfaces of one or both of the lower slider 66b and the upper slider 66a that slidably contact one another can be provided with a frictionless material, such as, for example, polytetrafluoroethylene (PTFE) or other similar friction reducing material. The upper sliders 66a are fixedly attached to the lower surface 52b of the first shield plate 52 via, for example, mechanical fasteners (not shown). The lower sliders 66b are rigidly fixed to the upper surface 58a of the second shield plate 58 via, for example, mechanical fasteners (not shown). The linear support structure 66 also prevent rotation of the second shield plate 56 about the second axis $A_2$.

The second track structure 56, including the fixed track member 56a and the slider 56b, extend along a second axis $A_2$ defined by the slider 56b. The second axis $A_2$ extends in the vehicle lateral directions $D_S$ and is transverse and perpendicular to the first axis $A_1$ (the vehicle longitudinal direction $D_L$). The slider 56b is configured to slide along the second axis $A_2$ and along the length of the fixed track member 56a. Further, the linear support structures 66 are parallel to the slider 56b and the second axis $A_2$ such that the lower sliders 66b are configured to slide parallel to the slider 56b and along the upper sliders 64a. The linear support structures 66 provide support and add stability to movement of the second shield plate 58 along the fixed track member 56a.

The fixed track member 56a and slider 56b are elements that provide precision positioning of the second shield plate 58 when the second shield plate 58 is moved and positioned by the actions of the second positioning device 60. Whereas, the linear support structures 66 are provided for support of the second shield plate 58 and other elements supported by the second shield plate 58.

The fixed track member 56a, the slider 56b and the linear support structures 66 support the second shield plate 58 such that the second shield plate 58 can be moved along the second axis $A_2$ (the vehicle lateral direction $D_S$) and positioned with precision by the second positioning device 60, as is described in greater detail below.

As mentioned above, the slider 56b and the lower sliders 66b are fixed to the upper surface 58a of the second shield plate 58. Consequently, the second shield plate 58 is movably connected to the lower surface 52b of the first shield plate 52 for linear movement with respect thereto via the support of the sliding movement of the slider 56b along the fixed track member 56a and the sliding movement of the lower sliders 66b along the upper slider 66a. More specifically, the second shield plate 58 is supported by the second track structure 56 for movement along the second axis $A_2$ (the vehicle lateral direction $D_S$) relative to the first shield plate 52.

Like the first shield plate 52, the second shield plate 58 is made of a material or can include a layer of a material that prevents transmission of electromagnetic radiation from a lower surface 58b (a second side) to the upper surface 58a (the first side) of the second shield plate 58. The second shield plate 58 is longer in the vehicle longitudinal direction $D_L$ and wider in the vehicle lateral directions $D_S$ than the vehicle-side induction coil 62 and the transmission coil 22, as is shown in FIGS. 3 and 4. Hence, like the first shield plate 52, the second shield plate 58 extends outward beyond an outer periphery of the vehicle-side induction coil 62 throughout an entire range of movement of the second shield plate 58 relative to the first shield plate 52. Consequently, the second shield plate 58 also provides a shielding effect that prevents electromagnetic radiation from penetrating the vehicle body structure 29 and passing into the passenger compartment of the vehicle 14.

The second positioning device 60 includes a housing 60a and a shaft 60b. In the depicted embodiment, the second positioning device 60 is basically a stepper motor or other positioning device that can precisely move an object connected thereto to a plurality of positions within a predetermined tolerance. In the alignment assembly 34, the second positioning device 60 can achieve precise linear positioning movement of the second shield plate 58 to within, for example, plus or minus 1.0 mm. The shaft 60b of the second positioning device 60 is moved linearly via worm gears (not shown) and/or other linear movement structures to effect movement and positioning of the second shield plate 58 relative to the first shield plate 52. Since stepper motors are conventional electro-mechanical devices, further description is omitted for the sake of brevity.

The housing 60a of the second positioning device 60 is fixedly attached to the lower surface 52b of the first shield plate 52. The shaft 60b is connected to the slider 56b. Since the slider 56b is rigidly fixed to the second shield plate 58, movement of the slider 56b by the first positioning device 60 causes corresponding linear movement of the second shield plate 58 along the second axis $A_2$.

The first shield plate 52 and the second shield plate 58 are sized and configured such that at least one of (and in the depicted body both) the first shield plate 52 and the second shield plate 58 is positioned between the transmission coil 22 and the vehicle body structure 29 throughout the entire range of movement of the first shield plate 52 and the second shield plate 58 when the vehicle-side induction coil 62 is in at least partial alignment with the transmission coil 22. The size and dimensions of the first shield plate 52 and the second shield plate 58 is such that they are both located between the vehicle body structure 29 and the transmission coil 22 with the vehicle-side induction coil 62 being positioned relative to the transmission coil 22 with the vehicle-side induction coil 62 having an efficiency of reception of electromagnetic radiation from the transmission coil that is equal to or greater to a predetermined level of efficiency, as described further below.

As shown in FIGS. 3 and 4, the vehicle-side induction coil 62 is fixedly attached to the lower surface 58b (the second side) of the second shield plate 58. The vehicle-side induction coil 62 is configured to generate electric current in response reception of electromagnetic radiation transmitted from the transmission coil 22. The overall size and dimensions of the vehicle-side induction coil 62 are determined based upon the charging power needs of the battery B of the vehicle 14 and the capabilities of the transmission coil 22. However, in the depicted embodiment the vehicle-side induction coil 62 has an outer diameter of between 25.0 cm and 35.0 cm. Further, the diameter of the vehicle-side induction coil 62 can be 30.0 cm.

A description is now provided of the operation of the wireless charging structure 10. As shown in FIGS. 1 and 2, the power controller 20 and the transmission coil 22 are electrically connected to one another by the cable C. As is explained below, the power controller 20 is configured to transmit and receive signals transmitted from the controller 32 of the vehicle 14. The power controller 20 is also configured to control the level of electromagnetic energy (electromagnetic radiation) emitted by the transmission coil 22. Further, as shown in FIGS. 1, 3 and 4, the controller 32 is electronically connected to the battery B, the first positioning device 54 (a stepper motor) and the second positioning device 60 (another stepper motor). The controller 32 is configured to operate the first and second positioning devices 54 and 60 to move and position the first shield plate 52 and the second shield plate 58 relative to the vehicle 14 in order to optimize the position of the vehicle-side induction coil 62 relative to the transmission coil 22. In other words, the controller 32 is configured and programmed to align the center of the vehicle-side induction coil 62 with the center of the transmission coil 22 in order to maximize the vehicle-side induction coil 62 reception of electromagnetic radiation transmitted by the transmission coil 22.

Figure 8:
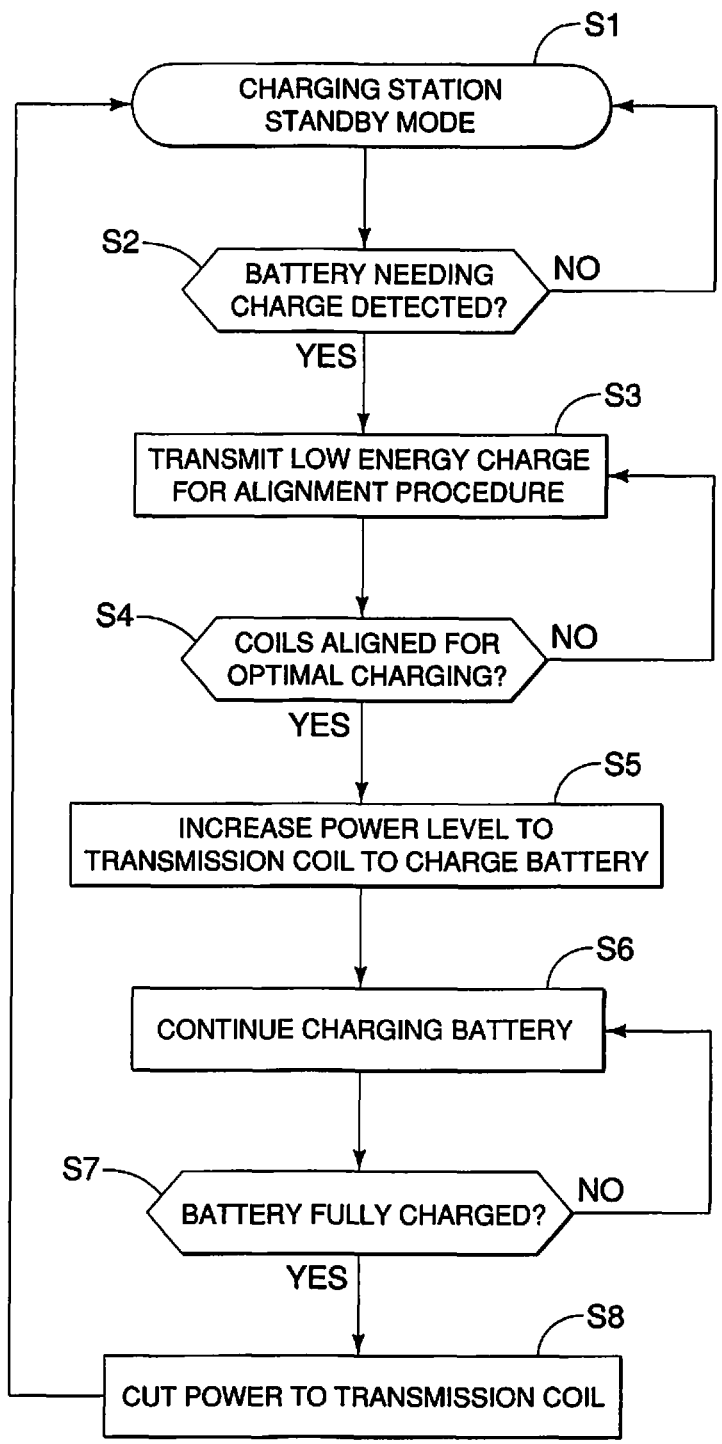
FIG. 8 is a flowchart depicting operational steps performed by the power controller of the transmission charging assembly during operation of the transmission coil in accordance with the first embodiment.

FIG. 8 is a flowchart that shows basic operational steps conducted by the power controller 20 in the control of the transmission coil 22. The power controller 20 can include a power switch (not shown) or can include a power reduction circuit that powers down the power controller 20 when not in use for a predetermined period of time. In a power reduction mode, the power controller 20 is in a standby mode, as indicated in step S1 in FIG. 8. At step S2, the power controller 20 monitors the transmission coil 22 via, for example, wireless communication or by detecting electromagnetic field disturbances at the transmission coil 22 in order to determine whether or not a vehicle 14 with the vehicle-side induction coil 62 has parked over the transmission coil 22, and further determines whether or not the battery B is in need of charging. The operation in step S2 can include wireless communication signals sent back and forth between the vehicle-side induction coil 62 and the transmission coil 22 (i.e., "handshakes"). More specifically, the transmission coil 22 can receive signals transmitted from the vehicle-side induction coil 62 or other electronic communication circuitry (not shown) within the vehicle 14 in order for the power controller 20 to determine whether or not the vehicle 14 is parked in the parking area P and determine whether or not the battery B needs to be charged.

Further, the power controller 20 is activated and leaves the standby mode via any one of the following: a signal from a vehicle operator via a wireless communication device; a mechanical electrical switch on or adjacent to the power controller 20; or detection by the power controller 20 of the presence of the vehicle-side induction coil 62 of the vehicle 14 being parked above the transmission coil 22.

At step S2, if the power controller 20 determines that the vehicle 14 is present and that the battery B needs charging, operation moves to step S3. Otherwise, the power controller 20 returns to the standby mode in step S1.

At step S3, the power controller 20 sends a predetermined level of power to the transmission coil 22 causing the transmission coil 22 to transmit a low energy of electromagnetic energy charge to the vehicle-side induction coil 62 that signals the controller 32 via the vehicle-side induction coil 62. In response, the controller 32 of the vehicle 14 checks the alignment between the transmission coil 22 and the vehicle-side induction coil 62 in the process described below with respect to the flowcharts depicted in FIGS. 9-11.

At step S4, the power controller 20 checks to see if a signal has been received from the controller 32 indicating alignment between the transmission coil 22 and the vehicle-side induction coil 62. The power controller 20 uses the signal in order to determine whether or not the transmission coil 22 and the vehicle-side induction coil 62 are acceptably aligned with one another. At step S4, if the power controller 20 determines that the transmission coil 22 and the vehicle-side induction coil 62 are not yet aligned, operation returns to step S3 where the low level of electromagnetic energy continues to the transmitted by the transmission coil 22. At step S4 if the power controller 20 determines that the transmission coil 20 and the vehicle-side induction coil 62 are acceptably aligned, then operation moves to step S5. At step S5, the power controller 20 causes the transmission coil 20 to increase the level of transmission of electromagnetic energy to a level that enables charging of the battery B. At step S6, the power controller 20 continues to cause the transmission coil 20 to emit the increased level of transmission of electromagnetic energy in order to continue charging the battery B.

At step S7, the power controller 20 determines whether or not the battery B is fully charged or not based on a signal or signals from the controller 32 of the vehicle 14. If the battery is not fully charged, control returns to step S6 and the power controller 20 continues to cause the transmission coil 20 to emit the level of transmission of electromagnetic energy in order to continue charging the battery B. If the power controller 20 determines that the battery B is fully charged based on a signal or signals from the controller 32 of the vehicle 14, then operation moves to step S8, where the power controller 20 reduces or completely cuts power to the transmission coil 20 thereby ceasing charging of the battery B. Thereafter operation returns to step S1, where the power controller 20 goes back to standby mode. It should be understood from the drawings and description herein, that the power controller 20 can also continue to monitor the status of the battery B, and perform periodic battery tending, where charging is resumed after a predetermined period of time to ensure the battery G is maintained at a maximum charge.

Figure 9:
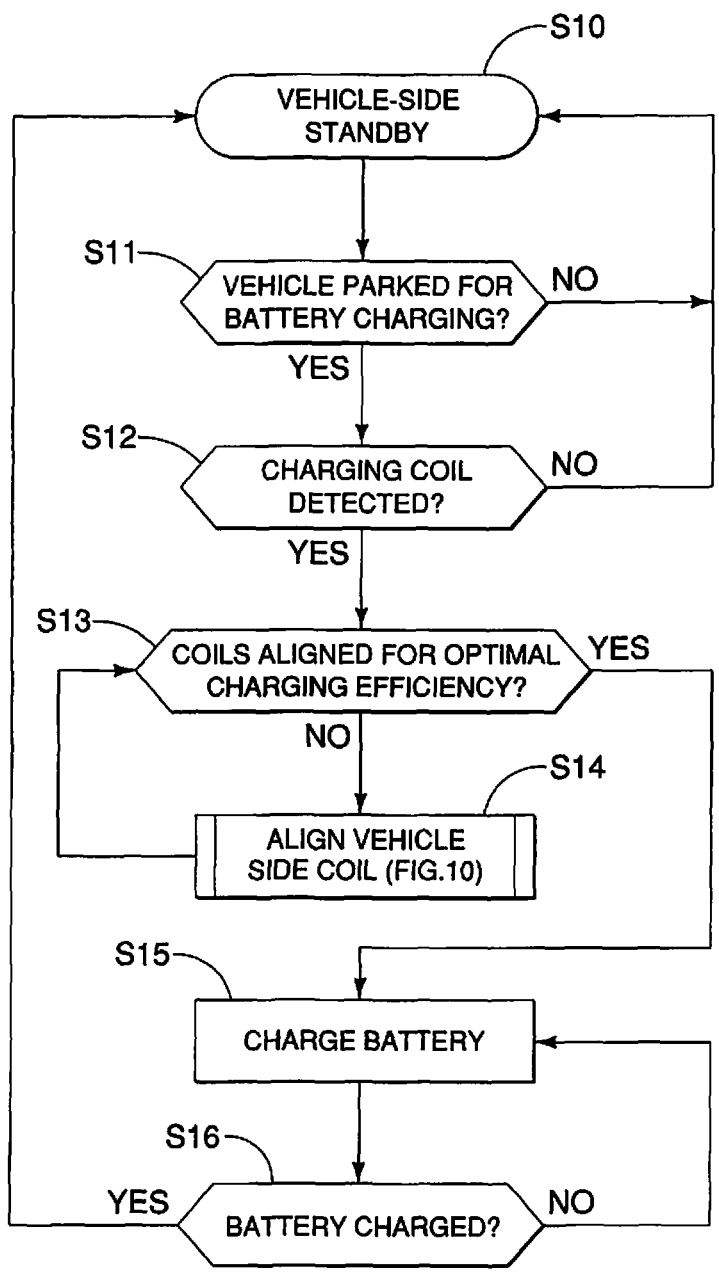
FIG. 9 is a flowchart depicting operational steps performed by the controller of the vehicle in determining whether or not a battery of the vehicle needs to be charged and whether or not the vehicle is parked above the transmission coil in accordance with the first embodiment.
Figure 10:
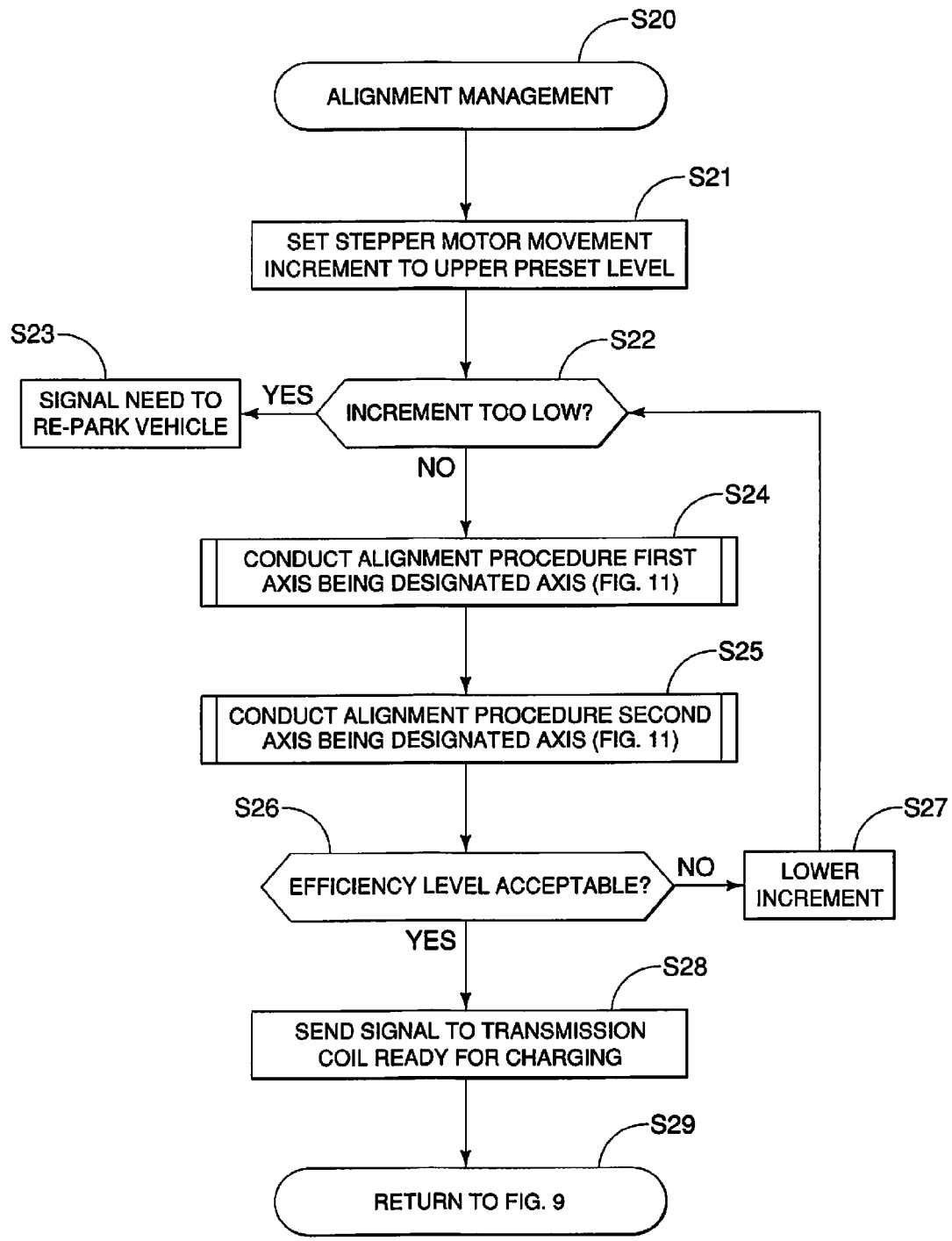
FIG. 10 is a flowchart depicting operational steps performed by the controller of the vehicle in preparation for aligning the vehicle-side induction coil with the transmission coil in accordance with the first embodiment.
Figure 11:
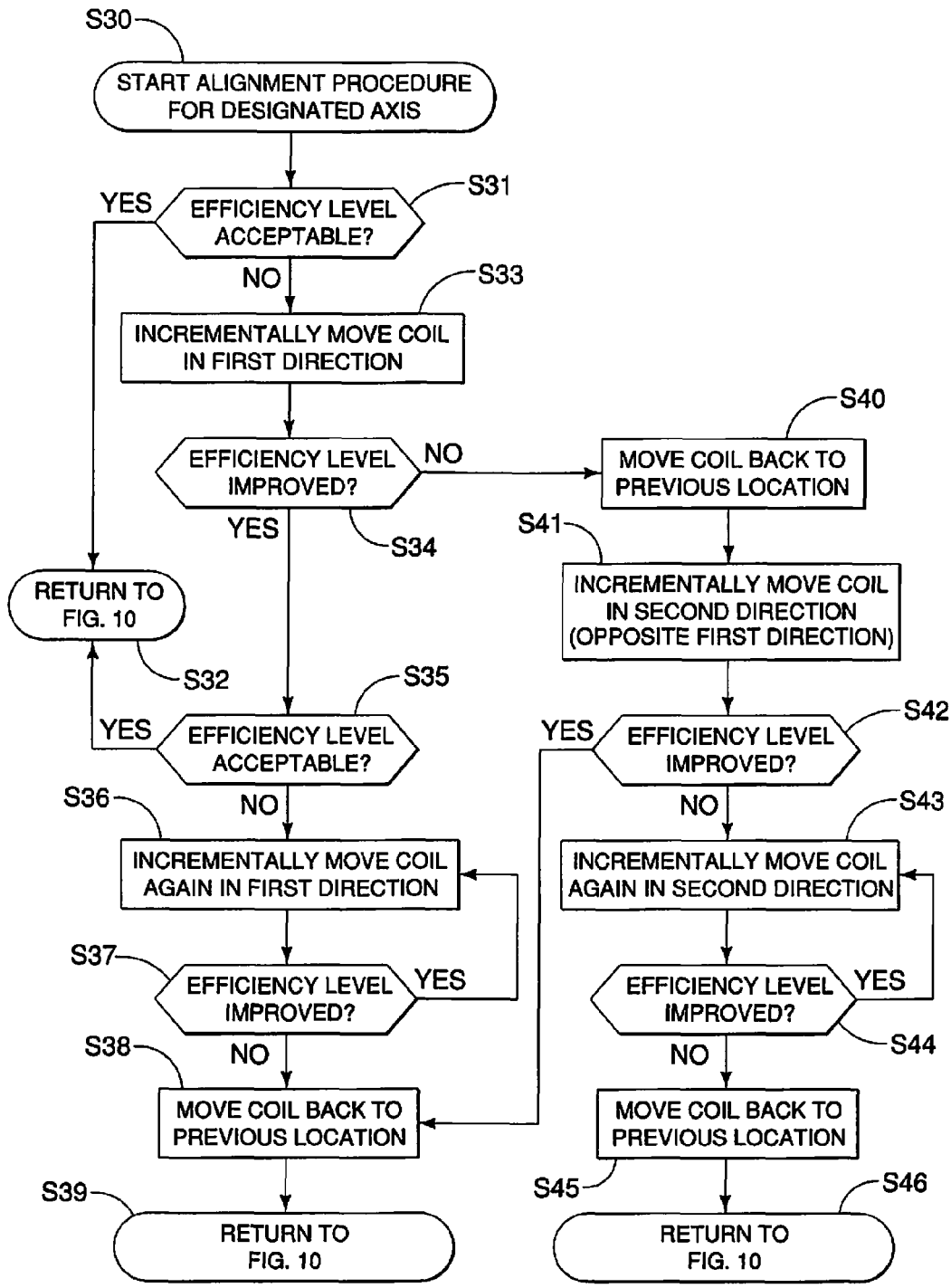
FIG. 11 is a flowchart depicting operational steps performed by the controller of the vehicle in the aligning of the vehicle-side induction coil with the transmission coil prior to charging of the battery in accordance with the first embodiment.

A description is now provided for operation of the reception charging assembly 16 of the vehicle 14 with specific reference to FIGS. 9-11. During normal operation of the vehicle 14, the reception charging assembly 16 is inactive and remains stationary relative to the vehicle 14, except that the controller 32 monitors the condition of the battery B. Specifically, the controller 32 monitors the level of the charge being maintained by the battery B. If the battery B is nearing a depletion state, the controller 32 can provide such information to the vehicle operator indicating that battery charging will soon be necessary. Otherwise, the controller 32 is maintained in the standby mode, as indicated in step S10 of FIG. 9.

At step S10, the controller 32 leaves the standby mode automatically in the event that the vehicle 14 has been parked and shut off. Thereafter, the controller 32 moves to step S11 where the controller 32 determines whether or not the vehicle 14 has been parked in a charging station, such as the parking area P depicted in FIG. 1. As mentioned above, the stops 24 are installed to the surface S of the parking area P in order to provide the vehicle operator with an approximate location in which to park the vehicle 14. Thus, when parking the vehicle 14, it is assumed that the front wheels 28 of the vehicle 14 contact the stops 24. When parked in this manner, the vehicle-side induction coil 62 should be located above the transmission coil 22, but may not be perfectly aligned. The vehicle-side induction coil 62 is therefore in an approximate alignment position with at least a portion of the vehicle-side induction coil 62 overlapping the transmission coil 22, as viewed from above, as shown in FIG. 2.

In step S11, if the vehicle 14 has not been parked in the parking area P, operation returns to step S10 and the standby mode. If the controller 32 determines at step S11 that the vehicle 14 has been parked in a charging station, the controller 32 then determines whether or not the transmission coil 22 is present and activated by transmission of a low level of electromagnetic energy or radiation. The controller 32 and/or the vehicle-side induction coil 62 is configured to transmit signals to and receive signals from the transmission coil 22 and/or the power controller 20 in order to determine the status of the output of the transmission coil 22.

At step S12, if the transmission coil 22 is detected to be emitting a low level of electromagnetic energy (radiation) for purposes of aligning the vehicle-side induction coil 62 with the transmission coil 22, operation moves to step S13. If the controller 32 determines that no energy is being emitted by the transmission coil 22, then operations return to step S10 and the standby mode.

At step S13, the controller 32 determines whether or not the transmission coil 22 and the vehicle-side induction coil 62 are aligned within predetermined parameters to allow efficient charging of the battery B. If the transmission coil 22 and the vehicle-side induction coil 62 are not aligned to the predetermined parameters, then operation moves to step S14 where the aligning procedures set forth in the flowcharts in FIGS. 10 and 11 are conducted, as described below. After the aligning procedures are completed, operation returns to step S13. If the transmission coil 22 and the vehicle-side induction coil 62 are not aligned to the predetermined parameters, operation can then again move to step S14. If the transmission coil 22 and the vehicle-side induction coil 62 are aligned to the predetermined parameters, then operation moves to step S15.

At step S14, a safeguard can be included that stops the alignment process from repeating indefinitely. The safeguard includes a signal to the vehicle operator that there may be a problem, such as the vehicle 14 may be parked in such a way that the vehicle-side induction coil 62 is too far away from the transmission coil 22 to enable optimal electromagnetic energy exchange between the transmission coil 22 and the vehicle-side induction coil 62.

At step S15, the controller 32 and/or the vehicle-side induction coil 62 transmits a signal to the transmission coil 22 and/or the power controller 20 indicating that charging can commence. In response, as mentioned above with respect to step S5 in FIG. 8, the power controller 20 increases the output of electromagnetic radiation from the transmission coil 22 thereby enabling charging of the battery B. In step S16, the controller 32 determines whether or not the battery B is fully charged. If the battery is not fully charged, operation returns to step S15 and charging continues. If the battery is fully charged in step S16, then the controller 32 and/or the vehicle-side induction coil 62 transmits a signal to the transmission coil 22 and/or the power controller 20 indicating that charging is completed. Thereafter, the controller 32 returns to the standby mode in step S10.

Upon moving from step S16, the controller 32 can be configured in any of a variety of manners. For example, as described further below, the controller 32 operates the first and second positioning devices 54 and 60. At the conclusion of the charging operation at step S16, the controller 32 can operate the first and second positioning devices 54 and 60 to return to a start position where the vehicle-side induction coil 62 is centered with respect to the alignment assembly 34.

Alternatively, upon moving from step S16, the controller 32 can be configured to lock the first and second positioning devices 54 and 60 thereby preventing any movement of the vehicle-side induction coil 62. This locking procedure can be advantageous if the vehicle 14 is always parked in the same charging station. The vehicle operator may be able to park the vehicle 14 in a position within the parking area P such that the alignment procedure is minimal or not necessary when the vehicle 14 is parked.

Description now moves to the steps outlined in FIG. 10, where the controller 32 manages the alignment procedure of the vehicle-side induction coil 62 relative to the transmission coil 22.

At step S20, the controller 32 enters an alignment management mode from operations at step S14 in FIG. 9. Operation immediately moves to step S21. At step S21, the controller 32 sets a variable "increment" that corresponds to stepper motor movement to a predetermined upper preset level. This step defines the increment of movement each time each of the first and second positioning devices 54 and 60 is operated to reposition the first shield plate 52 and the second shield plate 58. The upper preset level of the "increment" of movement of each of the stepper motors of the first and second positioning devices 54 and 60 is determined based upon the overall dimensions of the alignment assembly 34, the precision and tolerances of the first and second positioning devices 54 and 60 and tolerances of the first and second track structure 50 and 56. The upper preset level is provided in order to make the alignment process more efficient. For example, the upper present level can be between 2 mm and 20 mm, depending upon the overall tolerances of the various components of the alignment assembly 34.

Step S21 is basically an initialization of the variable "increment." The value of "increment" can be reduced by the controller 32 at step 27, as is explained in greater detail below.

Once the variable "increment" has been initialized, operation then moves to step S22 where the controller 32 determines whether or not the value of "increment" is too low or not. Initially, the value of "increment" is initialized at a maximum value defined as the upper preset level. The controller 32 is programmed with a minimum value of "increment" and the current value is compared with the minimum value. If the minimum values is equal to or greater than the current value of "increment" then operation moves to step S23, and a signal is sent to the vehicle operator that there is a problem with alignment, such as the vehicle-side induction coil 62 being too far out of alignment with the transmission coil 22 requiring re-parking of the vehicle 14 within the parking area P. If the minimum values is less that the current value of "increment" then operation moves to step S24.

At step S24, the controller 32 defines a "designated axis" for alignment movement as being the first axis $A_1$ (movement in the vehicle longitudinal direction $D_L$). Consequently, the first iteration of the steps in FIG. 11 will involve movement of the first shield plate 52 along the first track structure 50 via control of operation of the first positioning device 54. Once the "designated axis" is defined as movement in the first axis $A_1$, operation moves to FIG. 11, as described in greater detail below. The movements of the vehicle-side induction coil 62 conducted by the controller 32 with the "designated axis" for alignment movement being the first axis A, (the vehicle longitudinal direction $D_L$) are demonstrated in FIGS. 12a thru 12e, as is also described in greater detail below. When the first iteration of FIG. 11 is completed relative to the first axis $A_1$, control moves to step S25.

At step S25, the controller 32 defines the "designated axis" for alignment movement as being the second axis $A_2$ (extending in the vehicle lateral direction $D_S$). Consequently, the second iteration of the steps in FIG. 11 will involve movement of the second shield plate 56 along the second track structure 56 via control of operation of the second positioning device 60. Once the "designated axis" is defined as movement along the second axis $A_2$, operation moves again to FIG. 11, but with the controller 32 operating the second positioning device 60. The movements of the vehicle-side induction coil 62 conducted by the controller 32 with the "designated axis" for alignment movement being along the second axis $A_2$ (in the vehicle lateral direction $D_S$) are demonstrated in FIGS. 13a thru 13e, as is also described in greater detail below. When the second iteration of FIG. 11 is completed relative to the second axis $A_2$ (the slider 56b), control moves to step S26.

At step S26, the controller 32 determines whether or not the movements of the first and second positioning devices 54 and 60 were too large by evaluating the efficiency level. Specifically, if the movements of the first and second positioning devices 54 and 60 did not achieve adequate alignment, and may not have provided small enough movements to properly align the vehicle-side induction coil 62 with the transmission coil 22, then the efficiency level will not be acceptable and the controller 32 moves to step S27 where the controller 32 reduces the size of the variable "increment," thereby making each movement of the first and second positioning devices 54 and 60 smaller. The "increment" can initially be defined as, for example, 1 cm (10 mm), depending upon the tolerances of the overall apparatus and the tolerances of the first and second positioning devices 54 and 60. Alternatively, the "increment" can be greater than 10 mm or less than 10 mm.

If at step S26, the controller 32 determines that the efficiency level is acceptable indicating that the movements of the first and second positioning devices 54 and 60 were acceptable, and the vehicle-side induction coil 62 and the transmission coil 22 are adequately aligned, control moves to step S28.

As step S28, the controller 32 sends a signal to the power controller 20 indicating that the vehicle-side induction coil 62 and the transmission coil 22 are properly aligned. At this point, the power controller 20 is waiting at step S4 in FIG. 8 and moves to step S5 where power to the transmission coil 22 is increased to a level corresponding to charging of the battery B. Once the controller 32 determines that the transmission coil 22 is emitting a charging level of electromagnetic radiation, the controller 32 enables the vehicle-side induction coil 62 to receive the power from the transmission coil 22. The controller 32 further enables its circuitry to convert the alternating current energy transmitted from the transmission coil 22 to the vehicle-side induction coil 62 into direct current and providing that direct current to the battery B thereby charging the battery B. Operation then moves to step S29 where the logic returns to FIG. 9 completes step S14.

A description is now provided of the operational steps depicted in FIG. 11. The operational steps in FIG. 11 are used twice during the overall operation of the alignment assembly 34. As mentioned above, at step S24 in FIG. 10, the "designated axis" is defined as being the first axis $A_1$. Therefore, movement and positioning of the vehicle-side induction coil 62 will be in the vehicle longitudinal direction $D_L$. Further, the controller 32 operates the first positioning device 54 to move and position the first shield plate 52 in order to align the vehicle-side induction coil 62 with the transmission coil 22 along the first axis $A_1$. Consequently, during the first iteration of the steps in FIG. 11, the vehicle-side induction coil 62 is moved and positioned relative to the first axis $A_1$ (in the vehicle longitudinal direction $D_L$) as demonstrated in FIGS. 12a thru 12e. Thereafter at step S25 in FIG. 10, the "designated axis" is defined as being the second axis $A_2$. Therefore, movement and positioning of the vehicle-side induction coil 62 will be in the vehicle lateral direction $D_S$. Further, the controller 32 operates the second positioning device 60 to move and position the second shield plate 58. Consequently, during the second iteration of the steps in FIG. 11, the vehicle-side induction coil 62 is moved and positioned along the second axis $A_2$ (in the vehicle lateral direction $D_S$) as demonstrated in FIGS. 13a thru 13e.

The following description of operations in FIG. 11 is carried out with the "designated axis" extending along the first axis $A_1$ (the slider 50b), corresponding to the vehicle longitudinal direction $D_L$. At step S30 in FIG. 11, the controller 32 starts the alignment procedure for the designated axis. At this time, the transmission coil 22 is emitting a predetermined lowered level of electromagnetic radiation for purposes of aligning the vehicle-side induction coil 62 with the transmission coil 22 (as per step S3 in FIG. 8). At step S31, the controller 32 measures the amount of electromagnetic radiation being received by the vehicle-side induction coil 62 and determines the efficiency of the reception of the electromagnetic radiation. The controller 32 is either pre-programmed with the predetermined lowered level of electromagnetic radiation and/or receives a signal from the power controller 20 with information regarding the predetermined lowered level of electromagnetic radiation.

At step S31, the controller 32 determines whether or not the efficiency of the reception of the electromagnetic radiation meets an acceptable predetermined efficiency level. If the efficiency level of the reception of electromagnetic radiation is at or above the acceptable predetermined efficiency level, then no alignment is necessary and control moves to step S32 and returns to the operations in FIG. 10. If the efficiency level of the reception of electromagnetic radiation is below the acceptable predetermined efficiency level, then alignment is necessary and control moves to step S33.

Figure 12A:
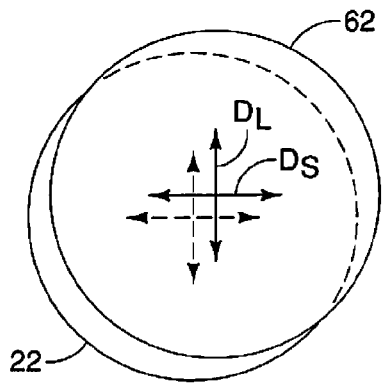
FIGS. 12a thru 12e are schematic views showing movement of the vehicle-side induction coil as performed by the controller in the steps depicted in FIG. 11 along a first axis (in a vehicle longitudinal direction) in accordance with the first embodiment.
Figure 12B:
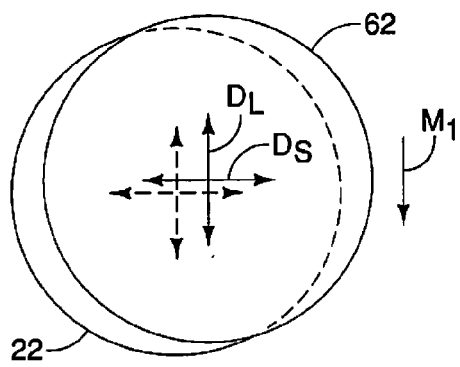

At step S33, the controller 32 operates the first positioning device 54 (the stepper motor) to move the slider 50b in a first direction along the first axis $A_1$ (in the vehicle longitudinal direction $D_L$) a distance equivalent to the defined "increment." The shaft 54a of the first positioning device 54 is fixed to the slider 50b and the slider 50b is fixed to the first shield plate 52. Consequently, movement effected by the first positioning device 54 translates into a first movement $M_1$ of the vehicle-side induction coil 62 along the first axis $A_1$. FIG. 12a shows an example of the position of the vehicle-side induction coil 62 relative to the transmission coil 22 when the vehicle 14 is parked in the parking area P. In FIG. 12a, the vehicle-side induction coil 62 is in the approximate alignment position mentioned above, and is therefore mis-aligned with the transmission coil 22. FIG. 12b shows the vehicle-side induction coil 62 moved by operation of the first positioning device 54 at step S33 as indicated by the first movement $M_1$. As can be seen by comparing FIG. 12a with FIG. 12b, the vehicle-side induction coil 62 has moved along the first axis $A_1$ (the vehicle longitudinal direction $D_L$).

Next, at step S34 in FIG. 11, the controller 32 determines whether or not the efficiency level has improved. If the efficiency level has not improved, operation moves to step S40, described further below. If the efficiency level has improved, operation moves to step S35.

At step S35, the controller 32 determines whether or not the efficiency level is now acceptable (at or above the acceptable predetermined efficiency level). If the efficiency level is acceptable, operation moves to step S32 and back to the steps in FIG. 10. If the efficiency level is not acceptable, operation moves to step S36.

Figure 12C:
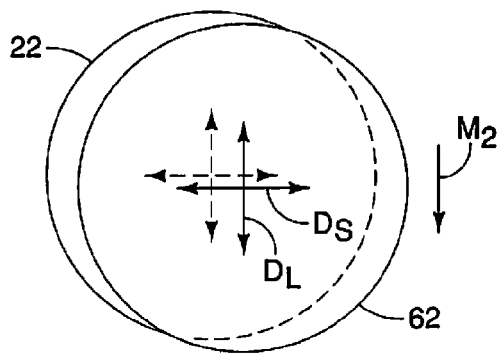

At step S36, the controller 32 again operates the first positioning device 54 to move the slider 50b again by a distance approximately equivalent to the defined "increment." FIG. 12b shows the position of the vehicle-side induction coil 62 after the first movement $M_1$ is made at step S33. FIG. 12c shows the vehicle-side induction coil 62 after a second movement $M_2$ made at step S36. As can be seen by comparing FIG. 12b with FIG. 12c, the vehicle-side induction coil 62 has made the second movement $M_2$ further along the first axis $A_1$ (in the vehicle longitudinal direction $D_L$) relative to the transmission coil 22.

Figure 12D:
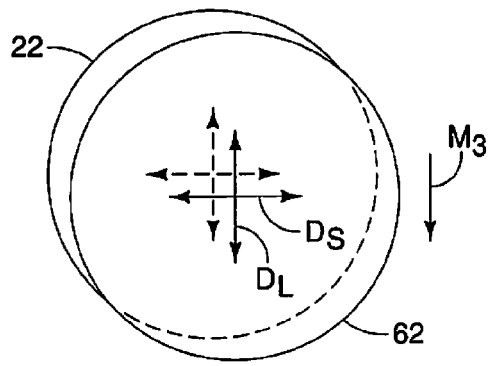

Next at step S37, the controller 32 determines again whether or not the efficiency level has improved. If the efficiency level has not improved, operation moves to step S38, described below. If the efficiency level has improved, operation returns to step S36, where third movement $M_3$ of the vehicle-side induction coil 62 is made by the controller 32. For demonstration purposes in the following description of FIGS. 12c and 12d, it is assumed that in step S37 the controller 32 determined that the efficiency level improved and control has returned again to Step S36 where the third movement $M_3$ of the vehicle-side induction coil 62 is conducted. FIG. 12c shows the position of the vehicle-side induction coil 62 after the second movement $M_2$ is made in the first passing through step S36. FIG. 12d shows the vehicle-side induction coil 62 after the third movement $M_3$ is made during a second passing through at step S36. As can be seen by comparing FIG. 12c with FIG. 12d, the vehicle-side induction coil 62 has moved further along the first axis $A_1$ (in the vehicle longitudinal direction $D_L$) relative to the transmission coil 22. However, FIG. 12d appears to show that the vehicle-side induction coil 62 is now moved to a position that does not improve efficiency.

Figure 12E:
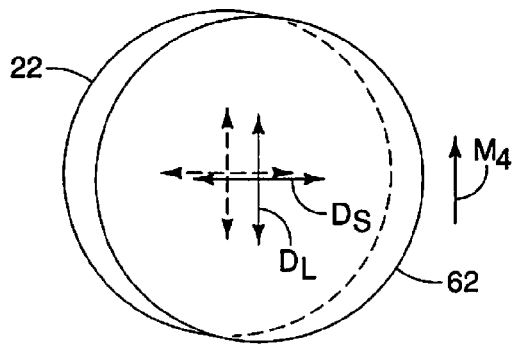

Operation again moves to step S37 where the controller 32 determines that the efficiency level has not improved, operation now moves to step S38. At step S38, the controller 32 causes the first positioning device 54 to return the vehicle-side induction coil 62 back to its previous position via a fourth movement $M_4$, as shown in FIG. 12e. As is shown in FIG. 12e, the fourth movement $M_4$ is in a direction that is opposite the first movement $M_1$, the second movement $M_2$ and the third movement $M_3$.

Thereafter, operation moves to step S39 where operations return to FIG. 10.

Returning to Step S34, if the controller 32 determines that the efficiency level has not improved, operation moves to step S40 where the vehicle-side induction coil 62 is moved back to its previous position (its initial position). Step S40 thru step S46 basically deal with the situation where the movement of the vehicle-side induction coil 62 to improve efficiency is in a direction corresponding the direction of the fourth movement $M_4$. Specifically, the first movement $M_1$, the second movement $M_2$ and the third movement $M_3$ are all movements in a first direction relative to the first axis $A_1$. The fourth movement $M_4$ is in a second direction opposite the first direction.

At step S41, the controller 32 causes the first positioning device 54 to move the slider 50b, the first shield plate 52 and the vehicle-side induction coil 62 in the second direction opposite the first direction along the first axis $A_1$ (a movement in the same direction as the fourth movement $M_4$). At step S42, the controller 32 determines whether or not the efficiency level has not improved. If the efficiency level has improved, operation moves to step S38. If the efficiency has not improved, operation moves to step S43.

At step S43, the controller 32 again causes the first positioning device 54 to move the slider 50b, the first shield plate 52 and the vehicle-side induction coil 62 in the second direction opposite the first direction along the first axis $A_1$ (a movement in the same direction as the fourth movement $M_4$). At step S44, the controller 32 again determines whether or not the efficiency level has not improved. If the efficiency level has improved, operation moves to step S43, such that steps S43 and S44 are repeated. If the efficiency has not improved, operation moves to step S45.

At step S45 the controller, moves the slider 50b, the first shield plate 52 and the vehicle-side induction coil 62 back to a position prior to the most recent movement thereof. At step S46, operation returns to FIG. 10 and step S25.

At step S25 in FIG. 10, the "designated axis" is defined and the second axis $A_2$ and operation moves back again to the flowchart in FIG. 11. All of the steps in FIG. 11 are repeated, but with all movements being made by the second positioning device 54 and along the second axis $A_2$ only. Since the steps in FIG. 11 are unchanged, except that movement is along the second axis $A_2$, further description is omitted for the sake of brevity. However, examples of the movements along the second axis $A_2$ of the vehicle-side induction coil 62 made during the second iteration of FIG. 11 are depicted in FIGS. 13a thru 13e.

Figure 13A:
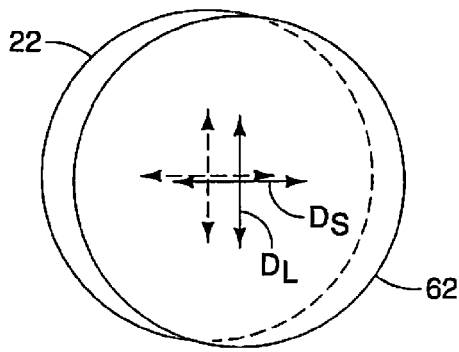
FIGS. 13a thru 13e are further schematic views showing movement of the vehicle-side induction coil as performed by the controller in the steps depicted in FIG. 11 along a second axis (in a vehicle lateral direction) perpendicular to the first axis in accordance with the first embodiment.
Figure 13B:
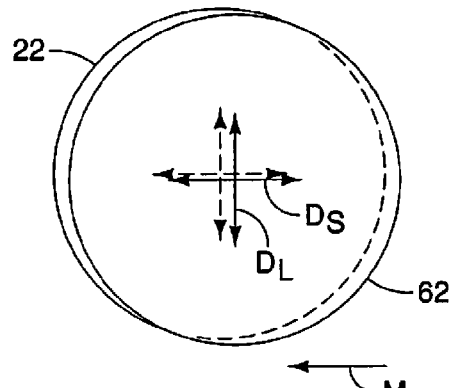

Specifically, during the iteration of the steps in FIG. 11 with the "designated axis" being the second axis $A_2$, at step S33 the controller 32 operates the second positioning device 60 (the stepper motor) to move the slider 56b in a first direction along the second axis $A_2$ (in the vehicle lateral direction $D_S$) a distance equivalent to the defined "increment." Movement of the shaft 60a of the second positioning device 60 (the shaft 60a is fixed to the slider 50b and the slider 50b is fixed to the first shield plate 52) causes a first movement $M_{10}$ of the vehicle-side induction coil 62 along the second axis $A_2$, from the relative positions shown in FIG. 13a to the positions shown in FIG. 13b.

FIG. 13a shows the vehicle-side induction coil 62 relative to the transmission coil 22 after completion of the alignment steps described above with respect to positioning movement with the first axis $A_1$ being the "designated axis." FIG. 13b shows the vehicle-side induction coil 62 moved by operation of the second positioning device 60 at step S33 as indicated by the first movement $M_{10}$ with the second axis $A_2$ being the "designated axis." As can be seen by comparing FIG. 13a with FIG. 13b, the vehicle-side induction coil 62 has moved along the second axis $A_2$ (the vehicle lateral direction $D_S$).

Figure 13C:
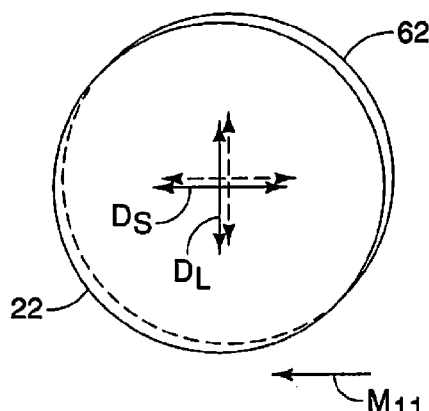

At step S36 in FIG. 11 with the second axis $A_2$ being the "designated axis," the controller 32 again operates the second positioning device 60 to move the slider 56b again by a distance approximately equivalent to the defined "increment." FIG. 13b shows the position of the vehicle-side induction coil 62 after the first movement $M_{10}$ made at step S33. FIG. 13c shows the vehicle-side induction coil 62 after a second movement $M_{11}$ made at step S36. As can be seen by comparing FIG. 13b with FIG. 13c, the vehicle-side induction coil 62 has moved in the second movement $M_{11}$ further along the second axis $A_2$ relative to the transmission coil 22.

Figure 13D:
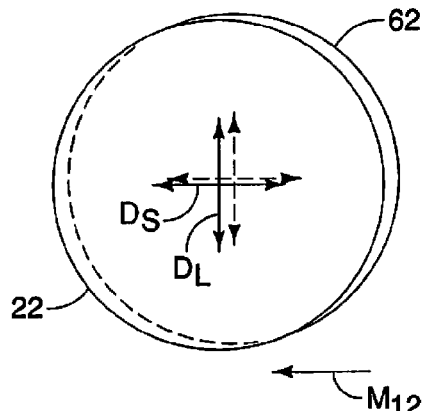
Figure 13E:
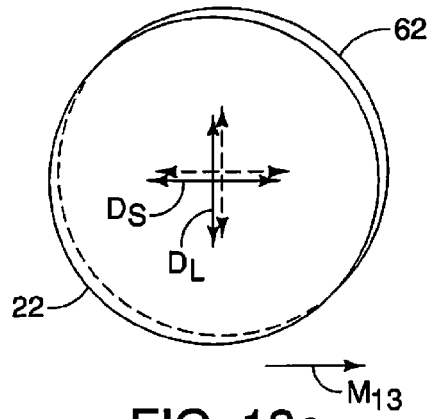

If the operation in step S36 in FIG. 11 is repeated, a third movement $M_{12}$ of the vehicle-side induction coil 62 along the second axis $A_2$ is made by the controller 32, as indicated in FIG. 13d. If the controller has determined that the third movement $M_{12}$ does not improve transmission efficiency, at step S38, the controller 32 causes the second positioning device 60 to return the vehicle-side induction coil 62 back to its previous position via a fourth movement $M_{13}$, as shown in FIG. 13e. As is shown in FIG. 13e, the fourth movement $M_{13}$ is in a direction that is opposite the first movement $M_{10}$, the second movement $M_{11}$ and the third movement $M_{12}$. In FIG. 11 at steps S38, S40 and S43, with the second axis $A_2$ being the "designated axis," the controller 32 causes the second positioning device 60 to move the slider 56b, the second shield plate 58 and the vehicle-side induction coil 62 in a second direction opposite the first direction along the second axis $A_2$.

As described above, the controller 32 is configured to operate the first positioning device 54 to linearly move and position the vehicle-side induction coil 62 along the first axis $A_1$ in order to more closely align the vehicle-side induction coil 62 with the transmission coil 22 relative to the first axis $A_1$. Thereafter, the controller 32 is configured to operate the second positioning device 60 to move and position the vehicle-side induction coil 62 along the second axis $A_2$ in order more closely align the vehicle-side induction coil 62 with the transmission coil 22 relative to the second axis $A_2$. If first attempts at alignment fail to yield a predetermined efficiency level, the "increment" of movement along each of the first and second axis $A_1$ and $A_2$ can be reduced to further refine the movement of the vehicle-side induction coil 62 along each of the first and second axis $A_1$ and $A_2$.

The efficiency level used by the controller 32 at, for example, step S26 in FIG. 10, is preferably above 80% efficiency. Specifically, at least 80% of the electromagnetic energy outputted by the transmission coil 22 is received by the vehicle-side induction coil 62 and converted into direct current to charge the battery B. However, the efficiency level is more preferably 90%.

If a center of the vehicle-side induction coil 62 is not aligned with a center of the transmission coil 22 by, for example, 50% of the overall diameter of the transmission coil 22, efficiency of energy transmittance can be below 60%, making consumption of energy to operate the transmission coil 22 very inefficient. If the center of the vehicle-side induction coil 62 is not aligned with a center of the transmission coil 22 by, for example, 25% of the overall diameter of the transmission coil 22, efficiency of energy transmittance can be below 80%, making consumption of energy to operate the transmission coil 22 more efficient, but still not an optimal efficiency. After using the above described alignment procedures, efficiency is improved. In the preferred embodiment, a 90% rate of efficiency is expected. More specifically, an acceptable predetermined efficiency level is 90% where 90% of the electromagnetic radiation emitted by the transmission coil 22 is received by the vehicle-side induction coil 62.

In the depicted embodiment, the transmission coil 22 and the vehicle-side induction coil 62 each have a diameter of approximately 31 cm (310 mm or approximately 1.0 foot in diameter). In the depicted embodiment, the vehicle-side induction coil 62 can be moved along the first axis $A_1$ (along the first track structure 50) approximately 150 mm in each direction from a centered position (centered relative to the first track structure 50). Thus, the vehicle-side induction coil 62 can be moved along the first axis $A_1$ a distance approximately equal to the diameter of each of the transmission coil 22 and the vehicle-side induction coil 62. Similarly, the vehicle-side induction coil 62 can be moved along the second axis $A_2$ (along the second track structure 56) approximately 150 mm in each direction from a centered position (centered relative to the first track structure 50). Thus, the vehicle-side induction coil 62 can be moved along the second axis $A_2$ a distance approximately equal to the diameter of each of the transmission coil 22 and the vehicle-side induction coil 62. Consequently, as long as the vehicle 14 is parked within the parking area P with at least a portion of the vehicle-side induction coil 62 overlapping with the transmission coil 22, the controller 32 can manipulate the first and second positioning devices 54 and 60 to bring the vehicle-side induction coil 62 into alignment with the transmission coil 22.

It should be understood from the drawings and the description herein, that above mentioned dimensions of the transmission coil 22, the vehicle-side induction coil 62 and the elements of the alignment assembly 34 can be scaled and redesigned in order to accommodate the recharging needs of any of a variety of shapes and designs of vehicles that require regular recharging of batteries. Specifically, outer diameters of the transmission coil 22 and the vehicle-side induction coil 62 is not limited to the diameter mentioned above. The transmission coil 22 and the vehicle-side induction coil 62 need not be the same diameter and can be larger or smaller depending upon the recharging requirements of the vehicle. Further, the lengths of the first and second track structures 50 and 56, and the overall dimensions of the first and second shield plates 52 and 58 can vary depending upon the desired position adjustment ranges of the first and second track structures 50 and 56.

Further, the first and second track structures 50 and 56 depicted in the first embodiment can be re-designed and reconfigured depending upon the overall design of the wireless charging structure 10 and the vehicle 12. For instance, in some designs only one of each of the linear support structures 64 and 66 might be necessary. Further, in the depicted embodiment, the first positioning device 54 is attached to the slider 50b and directly moves the slider 50b, and, the second positioning device 60 is attached to the slider 56b and directly moves the slider 56b. In an alternative embodiment (the second embodiment), the first positioning device 54 can be directly attached to the first shield plate 52 and the second positioning device 60 can be directly attached to the second shield plate 58. As well, the first and second track structure 50 and 56 can be oriented to position the first and second shield plates 52 and 58 in directions other than those depicted in the drawings. For example, the first track structure 50 can be oriented to position the first shield plate 52 along the vehicle lateral directions $D_S$ and the second track structure 56 can be oriented to position the second shield plate 58 along the vehicle longitudinal directions $D_L$.

Further, in the above described embodiment, the order of alignment can be reversed such that the second positioning device 60 is operated to adjust the position the second shield plate 58 and thereafter the first positioning device 54 is operated to adjust the position the first shield plate 52.

Second Embodiment

Figure 14:
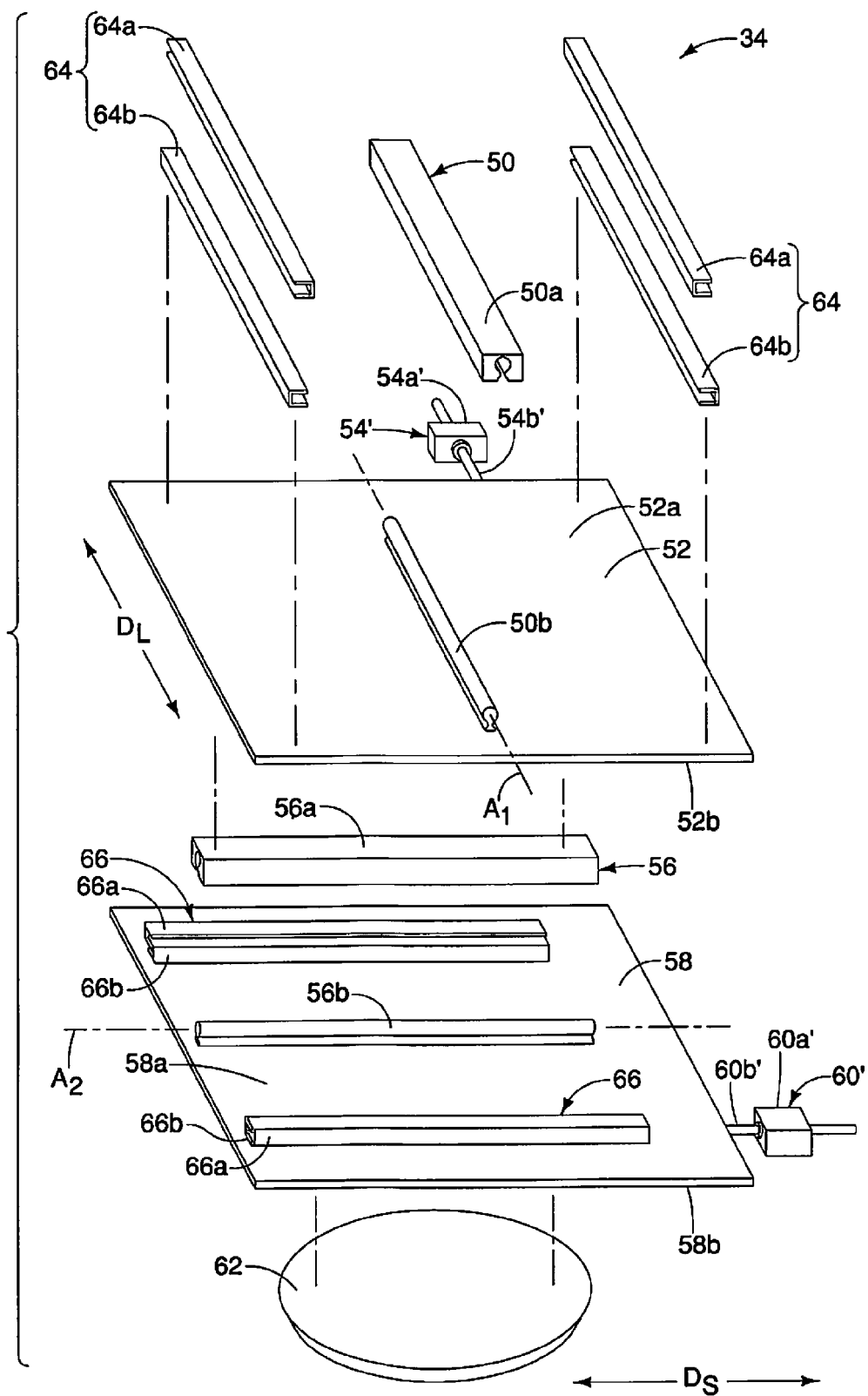
FIG. 14 is an exploded perspective view of an alignment assembly showing a first track structure, a pair of linear support structures, a first positioning device, a first shield plate, a second track structure, another pair of linear support structures, a second positioning device, a second shield plate and a vehicle-side induction coil in accordance with a second embodiment.

Referring now to FIG. 14, the alignment assembly 34 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The alignment assembly 34 includes all of the features of the first embodiment, including the first track structure 50 (with the fixed track member 50a and the slider 50b), the linear support structures 64 (with respective upper sliders 64a and lower sliders 64b), the first shield plate 52, the second track structure 56 (with the fixed track member 56a and the slider 56b), the linear support structures 66 (with respective upper sliders 66a and lower sliders 66b), the second shield plate 58, and the vehicle-side induction coil 62. All of the above listed elements are as described above with respect to the first embodiment.

In the second embodiment, the first positioning device 54 is replaced with a first positioning device 54' and the second positioning device 60 is replaced with a second positioning device 60'.

The first positioning device 54' includes a housing 54a' that is fixed to the underside surface 44 of the vehicle 14 and a shaft 54b' that is directly attached to the first shield plate 52. Hence, the first positioning device 54' directly moves and positions the first shield plate 52 along the first axis $A_1$. It should be understood from the drawings and the description herein that the first shield plate 52 is slidably supported by the first track structure 50 and is free to move along the first axis $A_1$ and is only constrained against such movement by the first positioning device 54'.

Further in the second embodiment, the second positioning device 60' includes a housing 60a' that is fixed to the first shield plate 52 and a shaft 60b' that is directly attached to the second shield plate 58. Hence, the second positioning device 60' directly moves and positions the second shield plate 58 along the second axis $A_2$. It should be understood from the drawings and the description herein that the second shield plate 58 is slidably supported by the second track structure 56 and is free to move along the second axis $A_2$ and is only constrained against such movement by the second positioning device 60'.

The power controller 20 and the controller 32 each preferably includes a microcomputer with respective alignment control programs that control corresponding features of the wireless charging structure 10, as discussed above. The power controller 20 and the controller 32 can each also include other conventional components such as an input interface circuit, an output interface circuit, and storage devices such as a ROM (Read Only Memory) device and a RAM (Random Access Memory) device. The microcomputers of the power controller 20 and the controller 32 are each programmed to control the respective portions of wireless charging structure 10. The memory circuits store processing results and control programs such as ones for wireless charging operations that are run by the processor circuits. The power controller 20 is operatively coupled to the transmission coil 22 in a conventional manner and the controller 32 is operatively coupled to the alignment assembly 34 and the vehicle-side induction coil 62 in conventional manners. The internal RAM of each of the power controller 20 and the controller 32 store statuses of operational flags and various control data. The internal ROMs of each of the power controller 20 and the controller 32 store the wireless charging protocols and alignment movement controls for various the operations described above. It will be apparent to those skilled in the art from this disclosure that the precise structure and algorithms for each of the power controller 20 and the controller 32 can be any combination of hardware and software that will carry out the functions of the present invention.

The various features of the vehicle 14 are conventional components that are well known in the art. Since vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" or "element" when used in the singular can have the dual meaning of a single part or a plurality of parts. Also as used herein to describe the above embodiments, the following directional terms "forward," "rearward," "above," "downward," "vertical," "horizontal," "below" and "transverse" as well as any other similar directional terms refer to those directions of a vehicle equipped with the wireless charging structure 10. Accordingly, these terms, as utilized to describe the present invention should be interpreted relative to a vehicle equipped with the wireless charging structure 10.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially," "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A vehicle having a wireless charging structure comprising:
 a vehicle body structure;

a first track structure fixedly attached to the vehicle body structure, the first track structure defining a first axis;

a first shield plate movably coupled to the first track structure for movement along the first axis;

a first positioning device coupled to vehicle body structure and being configured to move and position the first shield plate along the first track structure;

a second track structure fixedly attached to a second side of the first shield plate opposite the first side of the first shield plate, the second track structure defining a second axis transverse to the first axis;

a second shield plate having a first side mounted to the second track structure for movement along the second track structure;

a second positioning device coupled to the first shield plate, and being configured to move and position the second shield plate along the second axis; and a vehicle-side induction coil fixedly attached to a second side of the second shield plate opposite the first side of the second shield plate, the vehicle-side induction coil being configured to generate electric current in response reception of electromagnetic radiation.

2. The vehicle having a wireless charging structure according to claim 1, wherein
the first positioning device is a stepper motor and the second positioning device is a stepper motor.

3. The vehicle having a wireless charging structure according to claim 1, wherein
at least one of the first shield plate and the second shield plate includes a material or layer that prevents transmission of electromagnetic radiation from the second side to the first side of the at least one of the first shield plate and the second shield plate.

4. The vehicle having a wireless charging structure according to claim 1, further comprising:
a third track structure fixedly attached to the vehicle body structure and coupled to the first shield plate such that the first shield plate is movable along the third track structure, the third track structure being parallel to the first track structure.

5. The vehicle having a wireless charging structure according to claim 4, further comprising:
a fourth track structure fixedly attached to the second side of the first shield plate and coupled to the second shield plate such that the second shield plate is movable along the fourth track structure, the fourth track structure being parallel to the second track structure.

6. The vehicle having a wireless charging structure according to claim 1, further comprising:
a battery; and
a convertor circuit electrically coupled to the vehicle-side induction coil and the battery, the convertor circuit being configured to convert electric current from the vehicle-side induction coil into direct electric current in order to recharge the battery.

7. The vehicle having a wireless charging structure according to claim 1, wherein
the first shield plate and the second shield plate are located between the vehicle-side induction coil and the vehicle body structure, the first shield plate and the second shield plate being sized and configured such that at least one of the first shield plate and the second shield plate extends outward beyond an outer periphery of the vehicle-side induction coil throughout an entire range of movement of the first shield plate and the second shield plate.

8. The vehicle having a wireless charging structure according to claim 1, further comprising:
a cover of nonconductive material attached to the vehicle body structure and covering at least the first shield plate, the second shield plate, and the vehicle-side induction coil throughout the entire range of movement of the first shield plate and the second shield plate.

9. An adjustable wireless charging system comprising:
a transmission coil in a fixed position relative to a vehicle parking space, the transmission coil being configured to transmit electromagnetic radiation; and
a vehicle configured for parking within the vehicle parking space, the vehicle comprising:
a vehicle body structure;
a first track structure fixedly attached to the vehicle body structure and extending along a first axis;
a first shield plate with a first side movably mounted to the first track structure for movement along the first track structure;
a first positioning device coupled to vehicle body structure and configured to move the first shield plate along the first axis along the first track structure;
a second track structure with a first side fixedly attached to a second side of the first shield plate opposite the first side of the first shield plate, the second track structure defining a second axis transverse to the first axis;
a second shield plate with a first side movably mounted to the second track structure for movement along the second track structure;
a second positioning device coupled to the first shield plate and configured to move the second shield plate along the second axis defined by the second track structure; and
a vehicle-side induction coil fixedly attached to a second side of the second shield plate opposite the first side, the vehicle-side induction coil being configured to receive the electromagnetic radiation transmitted by the transmission coil.

10. The adjustable wireless charging system according to claim 9, further comprising
a controller configured to detect transmissions from the transmission coil and received by the vehicle-side induction coil, the controller being configured to determine the efficiency of reception by the vehicle-side induction coil of electromagnetic radiation from the transmission coil.

11. The adjustable wireless charging system according to claim 10, wherein
the controller is coupled to the first positioning device and the second positioning device and is further configured to operate the first positioning device and the second positioning device in order to move and position the vehicle-side induction coil relative to the transmission coil in response to determining the efficiency of reception by the vehicle-side induction coil of electromagnetic radiation from the transmission coil.

12. The adjustable wireless charging system according to claim 9, wherein
the first positioning device is a stepper motor and the second positioning device is a stepper motor.

13. The adjustable wireless charging system according to claim 9, wherein the second axis of the second track structure is perpendicular to the first axis.

14. The adjustable wireless charging system according to claim 9, further comprising:
a battery; and a controller electrically coupled to the vehicle-side induction coil and the battery,
the controller being configured to receive electric current from to the vehicle-side induction coil and convert the electric current into direct electric current in order to recharge the battery.

15. The adjustable wireless charging system according to claim 9, wherein
at least one of the first shield plate and the second shield plate includes a material or layer that prevents passage of electromagnetic radiation from the second side to the first side of the at least one of the first shield plate and the second shield plate.

16. The adjustable wireless charging system according to claim 15, wherein
at least one of the first shield plate and the second shield plate is dimensioned and configured to be located between the vehicle body structure and the transmission coil with the vehicle-side induction coil being positioned relative to the transmission coil with the vehicle-side induction coil having an efficiency of reception of electromagnetic radiation from the transmission coil that is equal to or greater to a predetermined level of efficiency.

17. The adjustable wireless charging system according to claim 15, wherein
the first shield plate and the second shield plate are sized and configured such that at least one of the first shield plate and the second shield plate is positioned between the transmission coil and the vehicle body structure throughout the entire range of movement of the first shield plate and the second shield plate when the vehicle-side induction coil is in at least partial alignment with the transmission coil.

18. The adjustable wireless charging system according to claim 9, wherein
the first shield plate and the second shield plate are larger along the first axis and the second axis than the vehicle-side induction coil and the transmission coil.

19. The adjustable wireless charging system according to claim 9, further comprising:
a cover of nonconductive material attached to the vehicle body structure and covering at least the first shield plate, the second shield plate, and the vehicle-side induction coil throughout the entire range of movement of the first shield plate and the second shield plate.

* * * * *